US009948708B2

(12) United States Patent
Wormley

(10) Patent No.: US 9,948,708 B2
(45) Date of Patent: Apr. 17, 2018

(54) DATA RETRIEVAL BASED ON BANDWIDTH COST AND DELAY

(75) Inventor: Nicholas A. Wormley, St. Paul, MN (US)

(73) Assignee: GOOGLE LLC, Mountain View, CA (US)

( * ) Notice: Subject to any disclaimer, the term of this patent is extended or adjusted under 35 U.S.C. 154(b) by 1070 days.

(21) Appl. No.: 12/791,555

(22) Filed: Jun. 1, 2010

(65) Prior Publication Data

US 2010/0306373 A1     Dec. 2, 2010

Related U.S. Application Data

(60) Provisional application No. 61/182,945, filed on Jun. 1, 2009.

(51) Int. Cl.
G06F 15/173 (2006.01)
H04L 29/08 (2006.01)

(52) U.S. Cl.
CPC ...... H04L 67/1029 (2013.01); H04L 67/1002 (2013.01); H04L 67/1012 (2013.01)

(58) Field of Classification Search
CPC ... H04L 12/2498; H04L 41/509; H04L 12/58; H04L 29/06176; H04L 65/00; H04L 65/80; H04L 67/322; H04L 47/24; H04L 49/205; H04L 41/5012; H04L 12/1863; H04N 21/238; H04N 21/239; H04N 21/26216; H04N 21/437; H04N 21/4516; H04N 2201/0072; G06F 11/3055
USPC ........................................................ 709/224
See application file for complete search history.

(56) References Cited

U.S. PATENT DOCUMENTS

| 4,881,264 A | 11/1989 | Merkle |
| 5,822,537 A | 10/1998 | Katseff et al. |
| 5,953,506 A | 9/1999 | Kalra et al. |
| 6,141,659 A | 10/2000 | Barker et al. |
| 6,169,747 B1 | 1/2001 | Sartain et al. |
| 6,195,680 B1 | 2/2001 | Goldszmidt et al. |
| 6,339,785 B1 | 1/2002 | Feigenbaum |

(Continued)

FOREIGN PATENT DOCUMENTS

| EP | 0911728 A1 | 4/1999 |
| EP | 1 298 931 A2 | 4/2003 |

(Continued)

OTHER PUBLICATIONS

Notice of Allowance from U.S. Appl. No. 12/490,128, dated Sep. 20, 2011, dated Sep. 20, 2011, 6 pp.

(Continued)

*Primary Examiner* — Viet D Vu
(74) *Attorney, Agent, or Firm* — Lowenstein Sandler LLP

(57) ABSTRACT

The invention provides for a download agent executing on a computing device. The download agent determines the status of each of the source servers, and downloads from source servers that are in the available state. Additionally the download agent tracks characteristics of the source servers. The download agent determines the required bandwidth of portions of the media content stored on the source servers. Based on the characteristics of the source servers and the required bandwidth of the portions of the media content, the download agent determines how much media content should be downloaded from which source servers and at what time.

33 Claims, 7 Drawing Sheets

(56) References Cited

U.S. PATENT DOCUMENTS

| | | | |
|---|---|---|---|
| 6,477,522 B1 | 11/2002 | Young | |
| 6,477,580 B1 | 11/2002 | Bowman-Amuah | |
| 6,601,136 B2 | 7/2003 | Gunaseelan et al. | |
| 6,742,023 B1 | 5/2004 | Fanning et al. | |
| 6,771,674 B1 | 8/2004 | Schuster et al. | |
| 6,772,337 B1 | 8/2004 | Yener | |
| 6,795,858 B1* | 9/2004 | Jain | H04L 67/1008 709/226 |
| 6,937,770 B1 | 8/2005 | Oguz et al. | |
| 7,047,309 B2 | 5/2006 | Baumann et al. | |
| 7,058,721 B1 | 6/2006 | Ellison et al. | |
| 7,069,014 B1 | 6/2006 | Thenthiruperai et al. | |
| 7,133,368 B2 | 11/2006 | Zhang et al. | |
| 7,185,082 B1 | 2/2007 | del Val et al. | |
| 7,240,358 B2 | 7/2007 | Horn et al. | |
| 7,251,691 B2 | 7/2007 | Boyd et al. | |
| 7,272,645 B2 | 9/2007 | Chang et al. | |
| 7,277,621 B2 | 10/2007 | Kunieda et al. | |
| 7,277,950 B1 | 10/2007 | Chapweske | |
| 7,337,231 B1* | 2/2008 | Li | 709/231 |
| 7,555,559 B2 | 6/2009 | Chapweske | |
| 7,788,398 B2 | 8/2010 | Chapweske et al. | |
| 7,831,718 B2 | 11/2010 | Chapweske | |
| 7,962,637 B2 | 6/2011 | Su et al. | |
| 7,979,570 B2 | 7/2011 | Chapweske et al. | |
| 8,103,786 B2 | 1/2012 | Chapweske | |
| 8,150,992 B2 | 4/2012 | Chapweske et al. | |
| 8,239,515 B2 | 8/2012 | Chapweske | |
| 8,250,191 B2 | 8/2012 | Hickmott et al. | |
| 8,301,732 B2 | 10/2012 | Chapweske et al. | |
| 8,312,107 B2 | 11/2012 | Chapweske | |
| 8,346,225 B2 | 1/2013 | Raleigh | |
| 8,375,140 B2 | 2/2013 | Tippin et al. | |
| 8,458,365 B2 | 6/2013 | Chapweske et al. | |
| 8,543,720 B2 | 9/2013 | Wormley et al. | |
| 8,635,360 B2 | 1/2014 | Brase et al. | |
| 8,661,098 B2 | 2/2014 | Chapweske et al. | |
| 8,694,606 B2 | 4/2014 | Chapweske | |
| 8,880,722 B2 | 11/2014 | Chapweske et al. | |
| 9,112,938 B2 | 8/2015 | Tippin et al. | |
| 2001/0051996 A1 | 12/2001 | Cooper et al. | |
| 2002/0002708 A1 | 1/2002 | Ayre | |
| 2002/0003541 A1 | 1/2002 | Boyd et al. | |
| 2002/0042924 A1* | 4/2002 | Adams | H04L 29/06027 725/114 |
| 2002/0049760 A1* | 4/2002 | Scott et al. | 707/10 |
| 2002/0049846 A1 | 4/2002 | Horen et al. | |
| 2002/0065922 A1 | 5/2002 | Shastri | |
| 2002/0087654 A1* | 7/2002 | Feigenbaum | 709/214 |
| 2002/0095400 A1 | 7/2002 | Johnson et al. | |
| 2002/0108112 A1 | 8/2002 | Wallace et al. | |
| 2002/0133247 A1 | 9/2002 | Smith et al. | |
| 2002/0138443 A1 | 9/2002 | Schran et al. | |
| 2002/0161909 A1 | 10/2002 | White | |
| 2002/0170067 A1 | 11/2002 | Norstrom et al. | |
| 2002/0178261 A1 | 11/2002 | Chang et al. | |
| 2002/0194310 A1 | 12/2002 | Chu et al. | |
| 2003/0067872 A1 | 4/2003 | Harrell et al. | |
| 2003/0123546 A1 | 7/2003 | Falik et al. | |
| 2003/0149755 A1* | 8/2003 | Sadot | H04L 29/06 709/223 |
| 2003/0184598 A1 | 10/2003 | Graham | |
| 2003/0231661 A1 | 12/2003 | DePietro et al. | |
| 2004/0031054 A1* | 2/2004 | Dankworth et al. | 725/86 |
| 2004/0064573 A1 | 4/2004 | Leaning et al. | |
| 2004/0078470 A1* | 4/2004 | Baumeister | H04L 29/06027 709/227 |
| 2004/0093396 A1 | 5/2004 | Akune | |
| 2004/0103372 A1* | 5/2004 | Graham | 715/513 |
| 2004/0111526 A1* | 6/2004 | Baldwin | H04N 5/4401 709/231 |
| 2004/0152422 A1* | 8/2004 | Hoglund | H04L 12/5695 455/67.11 |
| 2004/0172476 A1* | 9/2004 | Chapweske | 709/231 |
| 2004/0184774 A1 | 9/2004 | Kunieda et al. | |
| 2004/0193900 A1 | 9/2004 | Nair | |
| 2004/0205093 A1 | 10/2004 | Li et al. | |
| 2004/0260811 A1* | 12/2004 | Cherkasova | 709/225 |
| 2004/0267503 A1 | 12/2004 | Batterberry et al. | |
| 2004/0267940 A1 | 12/2004 | Dideriksen et al. | |
| 2005/0010792 A1 | 1/2005 | Carpentier et al. | |
| 2005/0021575 A1 | 1/2005 | Boyd et al. | |
| 2005/0065849 A1 | 3/2005 | Mitchell et al. | |
| 2005/0102371 A1* | 5/2005 | Aksu | H04L 29/06027 709/217 |
| 2005/0165849 A1 | 7/2005 | Moradi et al. | |
| 2005/0183120 A1* | 8/2005 | Jain et al. | 725/46 |
| 2005/0207733 A1 | 9/2005 | Gargi | |
| 2006/0015637 A1* | 1/2006 | Chung | 709/232 |
| 2006/0026161 A1 | 2/2006 | Henseler | |
| 2006/0149806 A1 | 7/2006 | Scott et al. | |
| 2006/0233237 A1 | 10/2006 | Lu et al. | |
| 2006/0235883 A1* | 10/2006 | Krebs | H03M 7/42 |
| 2007/0078876 A1* | 4/2007 | Hayashi | G06F 17/30035 |
| 2007/0088844 A1 | 4/2007 | Seims | |
| 2007/0157267 A1 | 7/2007 | Lopez-Estrada | |
| 2007/0160127 A1* | 7/2007 | Ratakonda | H04N 21/23439 375/240 |
| 2007/0261072 A1 | 11/2007 | Boulet et al. | |
| 2008/0034108 A1 | 2/2008 | Chapweske | |
| 2008/0040497 A1 | 2/2008 | Venkatramani et al. | |
| 2008/0046917 A1 | 2/2008 | de Heer | |
| 2008/0050096 A1 | 2/2008 | Ryu | |
| 2008/0104121 A1* | 5/2008 | Gottlieb et al. | |
| 2008/0140720 A1 | 6/2008 | Six et al. | |
| 2008/0141317 A1 | 6/2008 | Radloff et al. | |
| 2008/0201416 A1 | 8/2008 | Lipton | |
| 2009/0043906 A1* | 2/2009 | Hurst | H04N 21/23439 709/231 |
| 2009/0055742 A1* | 2/2009 | Nordhagen | G06F 17/30056 715/716 |
| 2009/0063699 A1 | 3/2009 | Chapweske et al. | |
| 2009/0106356 A1 | 4/2009 | Brase et al. | |
| 2009/0150557 A1 | 6/2009 | Wormley et al. | |
| 2009/0180430 A1 | 7/2009 | Fadell | |
| 2009/0185619 A1 | 7/2009 | Taleb et al. | |
| 2009/0225655 A1* | 9/2009 | Ray | H04L 47/10 370/231 |
| 2009/0254657 A1* | 10/2009 | Melnyk | H04L 47/10 709/224 |
| 2009/0287841 A1 | 11/2009 | Chapweske et al. | |
| 2009/0300203 A1* | 12/2009 | Virdi | H04N 21/2358 709/231 |
| 2009/0327512 A1 | 12/2009 | Chapweske et al. | |
| 2009/0328124 A1* | 12/2009 | Khouzam et al. | 725/116 |
| 2010/0023579 A1 | 1/2010 | Chapweske et al. | |
| 2010/0057928 A1 | 3/2010 | Kapoor et al. | |
| 2010/0146145 A1* | 6/2010 | Tippin et al. | 709/236 |
| 2010/0191656 A1 | 7/2010 | Martin et al. | |
| 2011/0022682 A1* | 1/2011 | Zanger et al. | 709/219 |
| 2011/0047215 A1* | 2/2011 | Guo et al. | 709/204 |
| 2011/0087755 A1 | 4/2011 | Chapweske | |
| 2011/0145878 A1* | 6/2011 | Gronning | 725/116 |
| 2011/0161493 A1 | 6/2011 | Hamel et al. | |
| 2011/0225312 A1* | 9/2011 | Liu et al. | 709/231 |
| 2011/0264771 A1 | 10/2011 | Chapweske et al. | |
| 2012/0110140 A1 | 5/2012 | Chapweske | |
| 2013/0024550 A1 | 1/2013 | Chapweske et al. | |
| 2013/0103728 A1 | 4/2013 | Chapweske | |
| 2013/0132525 A1 | 5/2013 | Tippin | |
| 2013/0254420 A1 | 9/2013 | Chapweske et al. | |
| 2013/0346627 A1 | 12/2013 | Wormley et al. | |

FOREIGN PATENT DOCUMENTS

| | | |
|---|---|---|
| EP | 1298931 A2 | 4/2003 |
| EP | 1605460 A1 | 12/2005 |
| EP | 1 638 333 A1 | 3/2006 |
| EP | 1848214 A1 | 10/2007 |
| GB | 2374746 A | 10/2002 |
| GB | 2 395 387 A | 5/2004 |
| JP | 2003067284 A | 3/2003 |

(56) References Cited

FOREIGN PATENT DOCUMENTS

| WO | 0139002 A1 | 5/2001 |
|---|---|---|
| WO | 0191417 A2 | 11/2001 |
| WO | 2007/063430 A2 | 6/2007 |
| WO | WO2009020640 A2 | 2/2009 |
| WO | WO2009054907 A2 | 4/2009 |
| WO | 2009/075766 A3 | 6/2009 |
| WO | WO2009075766 A2 | 6/2009 |
| WO | WO2009140208 A2 | 11/2009 |
| WO | WO2009155356 A1 | 12/2009 |

OTHER PUBLICATIONS

Office Action from U.S. Appl. No. 12/490,128, dated Feb. 3, 2011, 4 pp.
Response to Office Action dated Feb. 3, 2011, from U.S. Appl. No. 12/490,128, filed May 3, 2011, 10 pp.
Padmanabhan et al., "Distributing Streaming Media Content Using Cooperative Networking", Proceedings of the 12$^{th}$ International Workshop on Network and Operating Systems Support for Digital Audio: NOSSDAV, May 12-14, 2002, pp. 177-186.
Byers et al., "A Digital Fountain Approach to Reliable Distribution of Bulk Data", Proc. ACM SIGCOMM, ACM Press, New York, 1998, pp. 56-67.
V.K. Goyal, "Multiple Description Coding: Compression Meets the Network", IEEE Signal Processing Magazine, vol. 18, 2001, pp. 74-93.
Office Action for U.S. Appl. No. 10/788,695, dated Jan. 2, 2008, 9 pages.
Chu et al., "A Case for End System Multicast", Proceedings ACM SIGMETRICS 2000: International Conference on Measurement and Modeling of Computer Systems, Jun. 17-21, 2001, pp. 1-12.
Kaminsky, D., "Vectorcast: A Proposal Regarding the efficient Distribution of Data on High Bandwidth Networks," Jan. 12, 1998, 4 pages.
Francis, P., "Yallcast: Extending the Internet Multicast Architecture," Sep. 30, 1999, pp. 1-39.
Byers, J. et al., "Accessing Multiple Mirror Sites in Parallel: Using Tornado Codes to Speed Up Downloads," Apr. 1999, pp. 275-283.
Final Office Action for U.S. Appl. No. 10/788,695, dated Aug. 8, 2008, 11 pages.
Dessent, Brian, "Brian's BitTorrent FAQ and Guide", May 10, 2003, accessed from http://www.dessent.net/btfaq, 40 pgs.
Koman, Richard, "The Swarmcast Solution", May 24, 2001, accessed from http://openp2p.com/lpt/a/883, 4 pgs.
Office Action dated Sep. 18, 2009 for U.S. Appl. No. 11/861,774, (7 pages).
"Video Compression Picture Types", from Wikipedia, the free encyclopedia, http://en.wikipedia.org/w/index.php?title=Video_compression_picture_types&oldid=252563025, XP-002571418, printed Mar. 4, 2010, 5 pages.
Birney, "Intelligent Streaming," Inside Windows Media, Nov. 19, 1999, XP-002177089, 9 pp.
Rejaie et al., "Architectural Considerations for Playback of Quality Adaptive Video Over the Internet," Proceedings IEEE International Conference on Networks, Sep. 2000, pp. 204-209.
Wang, "Traffic Regulation under the Percentile-Based Pricing Policy," Proceedings of the First International Conference on Scalable Information Systems, Jun. 2006, 8 pp.
Duffield et al., "Issues of Quality and Multiplexing When Smoothing Rate Adaptive Video," IEEE Transactions on Multimedia, vol. 1, No. 4, Dec. 1999, 13 pp.
Gürses et al., "A Simple and Effective Mechanism for Stored Video Streaming with TCP Transport and Server-Side Adaptive Frame Discard," Computer Networks, 48, Dec. 30, 2004, pp. 489-501.
Carter et al., "Dynamic Server Selection using Bandwidth Probing in Wide-Area Networks," Computer Science Department, Boston University, Mar. 18, 1996, 20 pp.
Suh et al., "Push-to-Peer Video-on-Demand system: design and evaluation," Thomson Technical Report, Nov. 29, 2006, 15 pp.
Rodriguez et al., "Parallel-Access for Mirror Sites in the Internet," Institut EURECOM, Mar. 26, 2000, 864-873 pp.
International Search Report and Written Opinion of corresponding International application No. PCT/US2010/036889, dated Sep. 14, 2010, 13 pp.
Office Action from U.S. Appl. No. 12/630,582, dated Oct. 31, 2011, 25 pp.
International Preliminary Report on Patentability for corresponding international application No. PCT/US2010/036889, dated Dec. 15, 2011, 7 pp.
U.S. Appl. No. 13/569,163, filed Aug. 7, 2012.
International Search Report and Written Opinion of the International Searching Authority for PCT Application No. PCT/US2008/011801, dated May 19, 2009.

\* cited by examiner

DATA RETRIEVAL BASED ON BANDWIDTH COST AND DELAY

This application claims the benefit of U.S. Provisional Application Ser. No. 61/182,945 filed Jun. 1, 2009, the entire content of which is incorporated herein by reference.

TECHNICAL FIELD

The invention relates to computer networks and particularly to downloading media data on computer networks.

BACKGROUND

Media content providers provide media content stored on a server to users via one or more computer networks. Generally, individual clients (e.g., subscribers or users) receive media content on client devices (i.e., the device used to display the media content to the user) from media content providers through network links to the source server and display the media content via a media player executing on the client device. The displaying of media content is referred to as playback.

The source server stores copies of the media content as a media file. To transmit the media file, the source server transmits the media file on the network according to the encoded bit rate of the media file. In other words, when source server transmits the media file to client devices, the source server consumes the necessary bandwidth on the network based on the encoded bit rate of the media file to transmit the media file to client devices.

The client devices connect with the network at an established maximum throughput rate. The maximum throughput rate refers the maximum bit rate at which the client devices download the media file from the network. The established maximum throughput rate is based to either underlying technology of the link between the client devices and the network or contracted service levels for the clients. Actual throughput is the throughput rate at which the network conveys the data from the content provider, e.g., source server, to the individual client. The actual throughput to the client may only be a fraction of the maximum throughput based on environmental conditions and competing network traffic.

Since the actual throughput may vary based on environmental conditions and competing network traffic, the rate at which a client's media player must consume (i.e., receive and play) media over a network connection (be it a constant rate or an average rate) to achieve uninterrupted playback may exceed the actual throughput rate of the link between the client device and the network. In other words, the bandwidth required to transmit the media file may exceed the actual throughput rate to the client device from the network. In these situations, the media player must pause to wait for more data from the media content provider to arrive before it can continue to playback the media content. This pause, often referred to as buffering or re-buffering can greatly diminish the enjoyment of media viewing. In other situations, the client device may have insufficient computing resources to decode and present the media content in "real-time." In these situations, portions of the media content may be discarded, undecoded, or unplayed so that the media player may maintain proper playback of the received media content. The playback may also slow down to present all the data of the media content, but at a reduced rate. Either the dropping of data or the slowing of playback can reduce enjoyment, and if excessive, render the media content unwatchable.

To avoid buffering, dropping of data, or slowing of playback, media content providers may provide the clients with either the option of selecting an alternate media file encoded to consume less bandwidth or a default media file based on their particular network connection. The alternate media file contains similar content as the media file but is encoded to consume less bandwidth (e.g., encoded for a lower bit rate). However, during playback if the bandwidth necessary to transmit the selected media file exceeds the network throughput or the computing resources of the client device displaying the media content, the client has to explicitly begin playback of the media content encoded at a lower bandwidth which can cause startup delay associated with buffering and can require the user to start from the beginning of the media content. Needing to restart from the beginning every time the bandwidth necessary to transmit the selected media file exceeds the actual throughput or the computing resources of the device can drastically reduce the enjoyment of the media content.

In another technique to avoid buffering, dropping of data, or slowing of playback, the media player transmits playback status to the media content provider. The playback status can be the buffering time, the number of frames dropped, or the rate of playback. The media content provider dynamically varies the bit rate, e.g., dynamically varies the amount of needed bandwidth, of the media content to avoid buffering, dropping data, or slowing playback. However this technique has the negative consequence of requiring a separate content stream tailored for each recipient.

SUMMARY

In accordance with this disclosure, a media content provider provides media content stored on a plurality of source servers to clients via one or more computer networks. As described in more detail below, computing devices used by the clients, e.g., client devices, determine how much of the media content should be downloaded from which source servers and at what time based on the encoded bit rate, e.g., bandwidth, of the media content.

The plurality of source servers store copies of a media file that contains media content. The media file may be encoded with a variable bit rate (VBR). In VBR encoding techniques, different portions of the media file are encoded for different bandwidths, e.g., bit rates. The bandwidth of the media file refers to the amount of data that needs to be transmitted per unit of time, e.g., bits per second of the media file, so that a client computing device can properly render the media file without interruption. The media file may be encoded with the goal for a certain average bandwidth. However, portions within the media file may be encoded for higher or lower bandwidths relative to the average bandwidth of the media file.

The media content may be encoded using standard encoding techniques like MPEG-2 as one example. MPEG-2 encoding packetizes the media content into a plurality of frames. The frames may be intra (I) frames, predictive (P) frames, or bi-directional (B) frames. I frames are frames that are encoded without reference to any other frames and may provide an entirely encoded picture. P frames and B frames are encoded based on at least one other frame and generally contain image data and motion vector displacements that are relative to a previous frame in the stream. Generally, to reduce artifacts and distortion in the encoded media content, the ratio of I frames to P or B frames is low. However, a low I frames to P or B frames ratio increases the required bandwidth to transmit the media content, i.e., increases the number of bits that need to be transmitted for a given interval. On the other hand, a high ratio reduces the required bandwidth to transmit the media content. However, for a high ratio the artifacts and distortion in the encoded media content may be noticeable.

In some examples, the media content contained within the media file may be fully generated and stored on the plurality of source servers. Such media content may be referred to as non time-critical content. Examples of non time-critical content include movies, non-live television shows, web episodes, online media content found on websites like YouTube, and the like. The non-time critical content may be encoded for different bandwidths, e.g., bit rate, at different portions within the media file.

In some examples, the media content may not be fully generated. For example, all the media content may not be fully generated for a live performance that has not finished. During a live performance, the media content for the live performance is being generated simultaneously as the live performance is occurring. Such media content may be referred to as time-critical content. Examples of time-critical content include live concerts, sporting events, live news feeds, and the like. The time-critical content may be encoded for different bandwidths, e.g., bit rates, at different portions.

As noted above, the source servers store copies of the VBR encoded media content. The source servers may be located in different geographical locations throughout the world. The media content provider may contract a fee with different network providers such as Internet service providers (ISPs) to allow the media content provider to transmit the media file via the network, e.g., Internet, to the clients. The source servers may transmit data via geographically disparate networks. For example, the media content provider may contract a fee with a first ISP to allow a first source server located in Tokyo, Japan to transmit data via the Internet. The media content provider may contract a fee with a second ISP to allow second and third source servers located in Minneapolis, Minn. to transmit data via the Internet. The media content provider may contract a fee with a third ISP to allow a fourth source server located in Los Angles, Calif. to transmit data via the Internet.

Referring now to the client side, a download software agent executing on the computing device of a client (i.e., subscriber or user) device connects to a network, e.g., the Internet, to download the media file from the source servers. In accordance with this disclosure, the download agent downloads portions of the media file from the plurality of source servers and combines the separate portions for display to the client. The term "download portions of the media file from the plurality of source servers" may comprise at least two download techniques. In one technique, the download agent simultaneously downloads portions of the media file from the plurality of source servers, e.g., downloads the portions of the media file in parallel. In another technique, the download agent downloads a portion of the media file sequentially. However, each portion of the media file may be downloaded from different source servers, e.g., performs multisource download.

The download agent determines how much of the media content should be downloaded from which source servers and at what time. The download agent connects to each of the source servers via individual paths. For example, one connection from the download agent to a first source server may be considered a first path, one connection from the download agent to a second source server may be considered a second path, and so on.

In accordance with this disclosure, the download agent may find it optimal to weigh the factors of different paths to source servers to determine how the media file should be retrieved from the source servers, e.g., downloaded in parallel or downloaded sequentially from multiple different source servers. As one example, described in more detail below, the factor weighed by the download agent may include the amount the client device is delayed in displaying media content if the media content is live data or data that should be consumed in a timely fashion, e.g., time-critical content. As another example, described in more detail below, the factor weighed by the download agent may include the bandwidth required from a source server to download the media file. As yet another example, described in more detail below, the factor weighted by the download agent may include the throughput rate from the source server.

In some examples, to display a live event, a client device is delayed, i.e., backset, by a certain amount of time. The client device may not be displaying the actual now point of the live event. Instead, the client device may be displaying data that occurred some time prior to the now point. As described in more detail below, the download agent may account for how much the client device is delayed to determine how much data of the media content should be downloaded from which source servers and at what time.

The factors weighed by the download agent include characteristics of the source servers such as peak download times, geographic location of the servers, client privilege, client autonomous system number (ASN), and contracted fees that the media content provider pays to ISPs to allow the media content provider to provide the media content to client devices. As described in more detail below, the download agent may account for the various factors to determine how much data of the media content should be downloaded from which source servers and at what time.

For example, the download agent may account for the peak download times for the various servers. As one non-limiting example, the download agent may determine that it is preferable to download more media content from source servers that are not experiencing peak download times than source servers experiencing peak download times. As another example, the download agent may account for the geographic location of the servers. As one non-limiting example, the download agent may determine that it is better to download more media content from source servers that are geographically closer to the client device than other source servers. As yet another example, certain consumers may be designated as preferred consumers with respect to certain providers. Therefore download agents executing on client devices for those consumers may be configured to choose to download more media content from certain source servers that provide the media content the fastest (e.g., source servers with higher throughputs) due to the consumer's preferred status or contractual service level. As still another example, the download agent may choose to download more media content from source servers that are within the same autonomous system rather than source servers that are in different autonomous systems. As yet another example, the download agent may choose to download more media content from source servers that are capable of consuming more bandwidth to transmit the media content to the client devices without increases in costs to the media content provider compared to source servers where the cost that the media content provider needs to pay a network provider will be higher if the source servers consume more bandwidth to transmit the media content to the client devices.

The download agent may consider one or more of the example factors described above. In some instances one of the factors may compete with another one of the factors, and the download agent automatically weighs both factors to select the optimum source servers from which to download data. For example, the download agent may be configured to preferentially elect to download media content from source servers that are not currently experiencing peak download times and to preferentially elect to download media content from source servers that are geographically proximate to the client device. However, two source servers that are geographically proximate to the client device may experience peak download times at the same time, while a source server geographically distant from the client device may experience peak download times at a different time than the two geographically proximate source servers. In this example, the geographic proximity of the source servers is in direct competition with the peak download times of the geographically distant source server. In this example, the download agent may weigh the benefit of downloading from geographically proximate source servers with the benefit of downloading from geographically distant source servers that are not experiencing peak download times.

To compare the characteristics of the source servers described above, the download agent weighs factors associated with downloading a given portion of the media content from each of the source servers based on the total bandwidth required to transmit that portion of the media content. As used herein, the phrase "required bandwidth" or "bandwidth requirement" means the total bandwidth required to transmit portions of the media content. The download agent repeats this process for each portion of the media content. By weighing the factors for downloading the different portions of the media content from the different source servers based on the required bandwidth for the specific portions, the download agent is able to select paths to the source servers.

In some applications where a media file contains non time-critical content, the media file may additionally contain metadata from which the bandwidth requirements can be determined. For example, the media file may contain metadata listing playback timestamps, i.e., temporal locations, and corresponding byte ranges or offsets. The metadata may be embedded at the beginning of the media file. Alternatively, the metadata may be stored separately on one or more source servers.

The download agent initially downloads the metadata, in examples where the metadata is available. The download agent may request for the initial portion of the media file that contains the metadata or may request to download the metadata from at least one of the source servers. In examples where the metadata is separately stored on the source servers, the download agent may download the metadata only from one source server instead of from a plurality of source servers because the metadata is generally very small.

In accordance with this disclosure, based on the metadata, the download agent calculates actual bandwidth requirements for portions of the media content and determines how much of the media content should be downloaded from which servers and at what time. To compute the bandwidth requirements for portions of the media asset the download agent first determines the starting and ending byte offsets for the portion of the media asset and the starting and ending portion of timestamps for the portion of the media asset. The download agent then subtracts the starting byte offset from the ending byte offset to calculate the total bytes in the portion. The download agent subtracts the starting timestamp from the ending timestamp to calculate the total duration of the portion. The download agent multiplies the total byte in the portion by eight to calculate the total bits in the portion. Download agent then divides the total bits in the portion by the total duration in the portion to calculate the required bandwidth for that portion. For example, based on the metadata, the download agent may compute the bandwidth requirements to download media content starting from 10 minutes and 30 seconds playback point to the 11 minute playback point of the media file. To calculate the required bandwidth in this example, the download agent determines the number of bits that need to be transmitted for that 30 second portion (11 minutes minus 10 minutes and 30 seconds). Next, the download agent divides the determined number of bits by 30 seconds to calculate the required bandwidth to transmit that 30 second portion. For that 30 second portion, the download agent determines how much of that portion should be downloaded from which servers based on the configured preferences. Stated another way, the download agent may first determine the required bandwidth as the amount of actual data that needs to be downloaded for that portion of media content for the given amount of playback time. Next, the download agent may weigh the various factors based on the required bandwidth for that portion of the media content to find the optimum paths, e.g., source servers, to download data.

In some examples where the media content is time-critical content (i.e., a live concert), the metadata from which bandwidth requirements for different portions of the media content can be calculated may not be available as such media content may not have been generated. As described above, for time-critical content, e.g., live data, the client device is delayed a certain amount such that the client is viewing live data that occurred prior to the now point of the live data. While metadata that specifies byte ranges or offsets at playback temporal location may not be available, the required bandwidth for a recently encoded portion of the media content can be predicted from a recently generated I frame, P frame, or B frame. In accordance with this disclosure, the download agent may download the metadata for a portion of the media content that has not been downloaded, e.g., metadata for a recently generated I frame, P frame, or B frame. For example, the client may be viewing media content of the live event that occurred 10 seconds prior to the now point of the live event. As data for the now point of the live event becomes encoded, the download agent may download only the metadata for the recently encoded media content. The download agent does not download the actual media content just yet. Similar to non time-critical content, the download agent may first determine the required bandwidth for the just encoded media content based on the recently generated I frames, P frames, or B frames. Next, based on the required bandwidth for the just encoded media content, the download agent may weigh the various factors to select the optimum download paths.

For time-critical content, certain tradeoffs may be necessary. The longer the client device is delayed (i.e., shifted back in time) from the now point of the live event, the more time the download agent can utilize to select the optimum download paths. For example, if the client device is delayed 2 minutes, the download agent may have up to 2 minutes to find the optimum download paths. However, a client device that is delayed a long time may not be desirable. For example, for a live event such a sporting event, the consumer may be predominantly concerned with the score. If the client device is delayed a long time, the consumer may prefer to access a different website where the consumer can find the instantaneous score more easily.

As described above, the metadata may not be available for time-critical content, and may be available for non time-critical content. However, in some examples where the media content is non time-critical content, the metadata may not be available. For example, the metadata may not be separately downloadable and the metadata may not be added to the beginning of the media file. Rather the metadata may only be available as headers to individual frames. In such example, the download agent may download metadata from upcoming I frames, P frames, and B frames that describe the timestamps and byte ranges for those frames. Based on the timestamps and byte offsets, the download agent calculates the required bandwidth to download those frames. Based on the metadata, the download agent may determine optimum download paths.

Alternatively, in some examples, the download agent may not download the metadata. Instead, the download agent may extract the metadata from downloaded frames. Based on the metadata from downloaded frames, the download agent may estimate the bandwidth of future data. For example, instead of downloading metadata from upcoming frames, the download agent may track the required bandwidth for previously received frames based on the headers of the previously downloaded frames. Based on the required bandwidth for the previously received frames, the download agent may estimate the required bandwidth for future frames. For example, if the required bandwidth for the last 20 frames increased from one frame to the other, the download agent may calculate the standard deviation of the bandwidth for the last 20 frames. The download agent may then add the standard deviation to the bandwidth of the $20^{th}$ frame to estimate the required bandwidth for upcoming frames. Similarly, if the bandwidth for the frames is decreasing, the download agent may calculate the standard deviation and subtract the standard deviation from the $20^{th}$ frame to estimate the required bandwidth for upcoming frames. In these examples, based on the estimated bandwidth, the download agent may determine optimum download paths.

Generally, the distinction between non time-critical content and time-critical content may be that non time-critical content includes a fixed last byte while time-critical content includes a moving last byte. However, in either non time-critical content or time-critical content, the download agent considers small portions of the media asset and determines how those portions should be downloaded. For example, as described above, in some examples, non time-critical content includes metadata that is already generated for the entire media file and can be separately downloaded. For time-critical content the metadata may not be generated for the entire media file, but metadata for just encoded frames may be available. In either example, download agent uses metadata for the portions (either pre-generated and stored or just generated and stored) to determine how much of the media file should be downloaded from which source servers and at what time.

In one aspect, the disclosure is directed to a method comprising determining, with a client computing device, a status and characteristics of a plurality of source servers, and computing, with the client computing device, a bandwidth required to download a first portion of a media asset stored on the plurality of source servers, wherein the first portion corresponds to data for a specific playback time period of the media asset. The method also comprises determining, with the client computing device, how much of the first portion of the media asset to download from a plurality of selected ones of the source servers based on the status and characteristics of the plurality of source servers and the computed bandwidth for transmitting the first portion of the media asset, transmitting, from the client computing device, a plurality of requests for the first portion of the media asset to the plurality selected source servers, wherein each of the requests specifies how much of the first portion to download from each of the selected ones of the source servers. The method also comprises receiving the first portion of the media asset from the selected ones of the plurality of source servers, and displaying the first portion of the media asset with the client device via a media player.

In one aspect, the disclosure is directed to a device comprising a source manager that determines a status and characteristics of a plurality of source servers, a temporal metadata module that computes a bandwidth required to download a first portion of a media asset stored on the plurality of source servers, wherein the first portion corresponds to data for a specific playback time period of the media asset, and a stream agent that determines how much of the first portion of the media asset to download from a plurality of selected ones of the source servers based on the status and characteristics of the plurality of source servers and the computed bandwidth for transmitting the first portion of the media asset.

In one aspect, the disclosure is directed to a computer readable storage medium. The computer readable storage medium comprises instructions that cause one or more processors to determine a status and characteristics of a plurality of source servers, compute a bandwidth required to download a first portion of a media asset stored on the plurality of source servers, wherein the first portion corresponds to data for a specific playback time period of the media asset, and determine how much of the first portion of the media asset to download from a plurality of selected ones of the source servers based on the status and characteristics of the plurality of source servers and the computed bandwidth for transmitting the first portion of the media asset.

In one aspect, the disclosure is directed to an apparatus comprising means for determining a status and characteristics of a plurality of source servers, means for computing a bandwidth required to download a first portion of a media asset stored on the plurality of source servers, wherein the first portion corresponds to data for a specific playback time period of the media asset, and means for determining how much of the first portion of the media asset to download from a plurality of selected ones of the source servers based on the status and characteristics of the plurality of source servers and the computed bandwidth for transmitting the first portion of the media asset.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
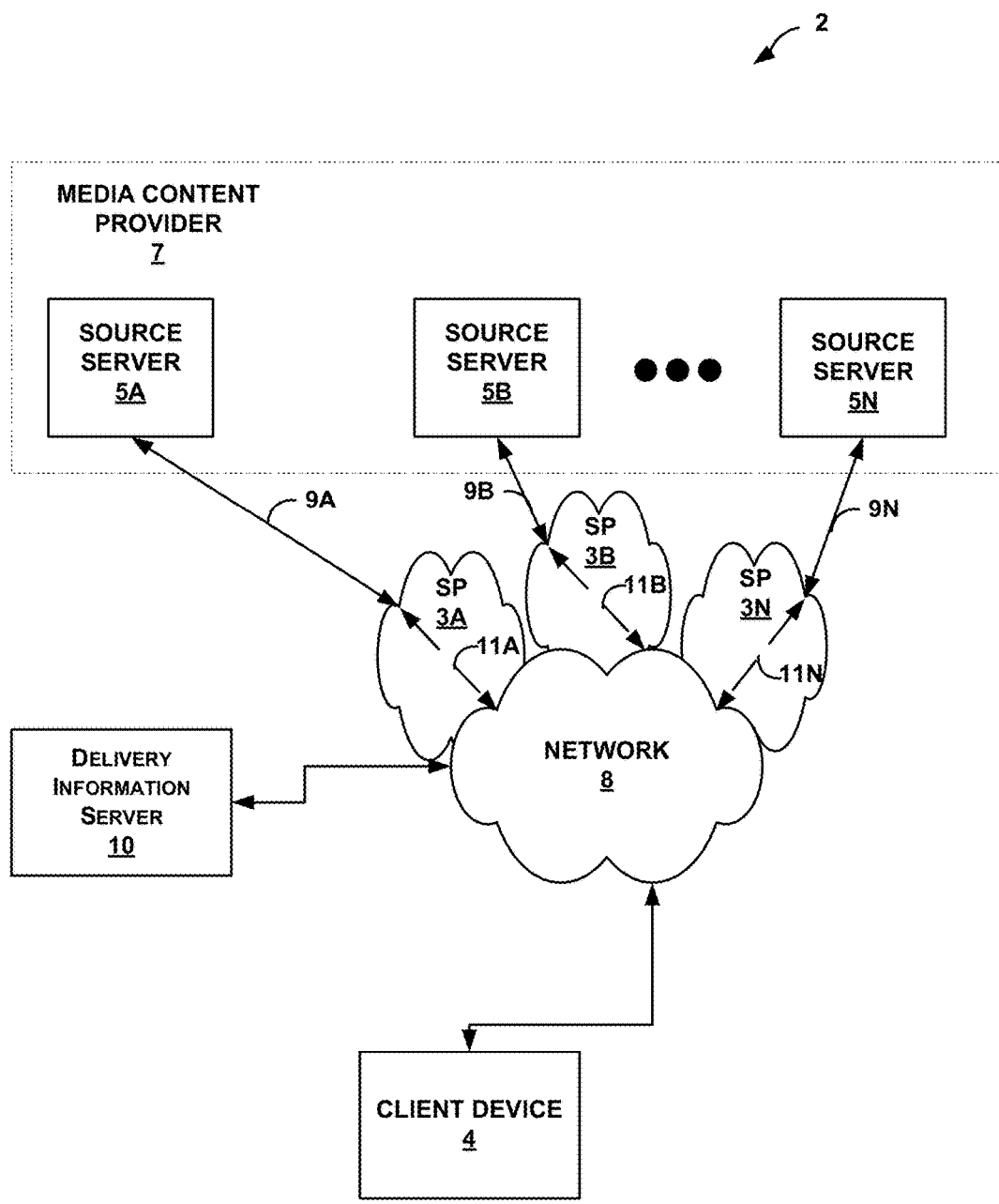
FIG. 1 is a schematic diagram illustrating an exemplary system for transmitting media content.

In accordance with this disclosure, a plurality of source servers store media content in a respective media asset (e.g. a media file). The media file may be divided into a plurality of media assets, where each media asset contains a portion of the entire media file. Each media asset may be individually accessible and storable. Each discrete media asset represents individual subsections of the media that are explicitly addressable by client devices. Each of the discrete media assets represents packetized data for a different portion of the media file. Each media asset may be considered as logical constructs of the media file. In some examples, the media file may be stored on a disk by the source servers. The source servers may generate the logical constructs, e.g., media assets, from the media file stored on the disk. Alternatively, the media assets may be stored on the disk by the source servers and the plurality of media assets comprises the media file.

The servers may be operated by a media content provider (MCP). The media asset may be encoded as variable bit rate (VBR) digital video. A VBR video is encoded for different bandwidths at different portions within the VBR video. The bandwidth of the media file refers to the amount of data per unit of time of the media file, e.g., bits per second of the media file, that needs to transmitted for a computing device to properly render the media file. For example, the content of a VBR video may be encoded in such a manner that requires higher bandwidth during dynamic video, e.g. rapid visual change, and lower bandwidth during less dynamic video, e.g. minimal visual change.

The required bandwidth of a VBR video may be represented in at least two ways. In a first way, the required bandwidth of the VBR video is represented as an overall average bandwidth. The overall average bandwidth is calculated by dividing the total number of bits in the VBR video by the total duration of the VBR video. However, the overall average bandwidth fails to account for instances within the VBR video where the required bandwidth is higher or lower than the overall average bandwidth. For example, the overall average bandwidth fails to account for the bandwidth required to transmit information for rapid visual changes and the bandwidth required to transmit information for minimal visual changes. The bandwidth required to transmit information for rapid visual changes may be greater than the bandwidth required to transmit information for minimal visual changes.

In a second way, the required bandwidth of the VBR video is represented as a portion average bandwidth. The portion average bandwidth is the required average bandwidth over a portion of the media asset. The media asset may be divided down into portions. For example, a three hour VBR video may be divided down into three hundred and sixty thirty second portions. Thirty second portions is just one example. The VBR video may be divided down by more or less than thirty seconds. The VBR video may be divided to portions of approximately 300 milliseconds (ms) to 500 ms. Furthermore, the portion need not be limited to temporal portions, e.g. thirty seconds. In some examples, the portion may be defined as a number of frames within the media asset.

In the context of video, each media asset of a VBR video contains a plurality of frames in accordance with a video compression scheme. One such frame is referred to as a key frame or intra picture that can be decoded without reference to other frames and may, for example, provide an entire encoded picture.

The portion average bandwidth may be calculated by dividing the number of bits in a portion of the VBR video by the playback duration of the VBR video during that portion. For example, assume the overall average bandwidth for a VBR video is 1.2 megabits per second (Mbps). In the VBR video, rapid visual changes may start at ninety minutes and zero seconds playback time into the VBR video and conclude at ninety minutes and thirty seconds into the VBR video. During the portion of rapid visual changes, i.e. ninety minutes zero seconds to ninety minutes thirty seconds, the portion average bandwidth may be 3 Mbps. In this example, the portion may be defined as thirty seconds, i.e. ninety minutes and thirty seconds minus ninety minutes. A portion of thirty seconds is just one example. The portion may be greater or less than thirty seconds. For example, the portion may approximately in the range of 300 ms to 500 ms. As another example, the portion may be an instance of the media content, e.g., the bandwidth at ninety minutes. Furthermore, the portion need not be uniform across the VBR video. The portion may vary over the VBR video. The portion average bandwidth may also be different for each portion within the VBR video.

Accordingly, the overall average bandwidth does not account for bandwidth changes that may occur during the VBR video. The required bandwidth for transmission may be different at different portions of the VBR video, such as during rapid visual changes compared to minimal visual changes. The portion average bandwidth may provide a better measure for the required bandwidth of the VBR video compared to the overall average bandwidth.

There may be at least two types of media assets: non time-critical content and time-critical content. For non time-critical content, the entire content is generated and stored on the servers. Examples of non time-critical content include movies, non-live television shows, web episodes, online media content found on websites like YouTube, and the like. The non time-critical content may be encoded for different bandwidths, e.g., bit rate, at different portions within the media file. For time-critical content, the entire content may be not generated and stored on the servers. Rather, the time-critical content may be generated as the event is occurring. For example, all the media content may not be fully generated for a live performance that has not finished. During a live performance, the media content for the live performance is being generated simultaneously as the live performance is occurring. Such media content may be referred to as time-critical content. Examples of time-critical content include live concerts, sporting events, live news feeds, and the like. The time-critical content may be encoded for different bandwidths, e.g., bit rates, at different portions.

In some examples, in addition to the media assets, one or more of the source servers may also store metadata. The metadata comprises a listing of playback timestamps, i.e., temporal locations, and corresponding byte ranges or offsets. For example, the metadata may indicate the number of bytes that need to be transmitted every 500 ms, e.g., the number of bytes that need to be transmitted from 1 ms to 500 ms, 501 ms to 1000 ms and so on. The 500 ms temporal locations are provided for illustration purposes only. Different examples may include larger or smaller intervals. The metadata may be stored at the beginning of the media file, or may be stored separately.

For non time-critical content, the metadata may be generated and stored on one or more of the servers. However, for time-critical content, the metadata may not be generated and stored because some of the media content is yet to be generated. For example, for a live event like a sporting event, the media content is generated as the live event occurs, and obviously it is impossible to generate media content for instances that are yet to occur. In such situations the metadata that indicates the timestamps and corresponding byte ranges may be stored as a header within just generated video frames.

As described so far, a plurality of source servers store portions of a media file referred to as media assets. The media assets may be generated based on VBR coding techniques. In some examples, the media assets may additionally include metadata that includes a listing of playback timestamps and corresponding byte ranges. Alternatively, the metadata may be stored separately on one or more source servers. In some examples, the metadata may be stored within a header of a generated video frame.

To provide the media assets to client devices, the MCP may operate the source servers and contract with one or more network providers, e.g., Internet service providers (ISPs), to allow the source servers to transmit data on the network, e.g., Internet. The source servers may be located in different locations throughout the world. Accordingly, the MCP may need to contract with different ISPs to allow the source servers to output data on to the Internet.

Turning now to the consumer side, a download agent executing on the computing device of a consumer (i.e., subscriber or user) connects to a network such as the Internet to download the media assets from the source servers that are also connected to the network. In accordance with this disclosure, the download agent downloads portions of the media file from the plurality of source servers. The term "download portions of the media file from the plurality of source servers" may comprise at least two download techniques. In one technique, the download agent simultaneously downloads portions of the media file from the plurality of source servers, e.g., downloads the portions of the media file in parallel. In another technique, the download agent downloads a portion of the media file sequentially. However, each portion of the media file may be downloaded from different source servers, e.g., performs multisource download. The download agent determines how much of the media file should be downloaded from each source server by weighing factors associated with each path versus the computed bandwidth requirements for each portion (i.e., time slice) of the media content. The factors may be the characteristics of the source servers. The download agent may connect to each of the source servers via individual network paths. Stated another way, one connection from the download agent to a first source server may be considered a first path, one connection from the download agent to a second source server may be considered a second path, and so on.

The download agent may find it optimal to weigh the factors of different paths to source servers to determine how the media file should be retrieved from the source servers. As one example, the factors weighed by the download agent may include delay if the media content is live data or data that should be consumed in a timely fashion. As another example, the factors weighed by the download agent may include the cost to the MCP to transmit data. As yet another example, the factors weighed by the download agent may include the achieved throughput rate for each the source server as monitored by the download agent. In accordance with this disclosure, a client device (e.g., computing device of a user) may take advantage of the variability of the bandwidth of the media file over a given portion. The download agent executing on the client device may determine paths to source servers that are cost effective for the MCP and/or constrained in other metrics to be able to receive the media file based on the bandwidth of the media file over a given portion.

In some examples, to display a live event, a client device is delayed, i.e., temporally backset, by a certain amount of time. The client device may not be displaying the actual "now point" of the live event. Instead, the client device may be displaying data that occurred some time prior to the now point, typically on the order of a seconds. As described in more detail below, the download agent may account for how much the client device is delayed to determine how much data of the media content should be downloaded from which source servers and at what time.

The factors that the download agent may weigh to select optimum paths, e.g., paths to source servers, may include characteristics of the source servers. The characteristics include peak download times, geographic location of the servers, client privilege, client autonomous system number (ASN), and contracted fees that the media content provider pays to ISPs to allow the media content provider to provide the media content to client devices. As described in more detail below, the download agent may account for the various factors to determine how much data of the media content should be downloaded from which source servers and at what time.

With respect to the fees that the MCP pays the ISP, the MCP pays a network provider such as an Internet service provider (ISP) a contracted fee to allow the media content provider to provide the media file to the client devices via the network, e.g., the Internet. The media content provider may pay the network provider based on the amount of bandwidth utilized by a source server. In other words, the media content provider pays the network provider based on the amount of bandwidth a source server utilizes to transmit the media file to the client devices via the network. Generally, the more bandwidth that is utilized the higher the fee the network provider charges the media content provider. As described in more detail below, the download agent may account for the amount of bandwidth utilized by source servers to determine how much data of the media content should be downloaded from which source servers and at what time. In some examples, download agent downloads the media content in parallel from two or more of the source servers, e.g., downloads the media content in parallel. In some other examples, download agent downloads portions of the media content sequentially. However, the download agent may download each portion of the media content from different source servers. In this example, the download agent performs multisource downloads.

The following is one example of how the download agent accounts for the peak download time, fees that the media content provider pays a network provider, and geographical location. As noted above, the source servers may be located in different geographical locations around the world. A first source server may be located in Minneapolis, Minn. and a second source server may be located in Tokyo, Japan. The peak download time for the first source server, i.e., time of day with the highest number of client devices are downloading data from the first source server, may be different than the peak download time for the second source server. The peak download time for the first source server and the second source server may be different because when it is daytime in Minneapolis, Minn. (where the first source server is located) it is nighttime in Tokyo, Japan (where the second source server is located). Generally, there are more people downloading data during the daytime than at nighttime.

During peak download times for a source server, there is a lot of competing network traffic for the various data on the source server. The large amount of competing network traffic may cause the source server to consume large amounts of bandwidth to transmit the media content driving up the costs for the media content provider. In accordance with this disclosure, the download agent may account for the peak download times for the various source servers to determine how much data should be downloaded from which geographically separate networks to minimize the cost to the media content provider.

The download agent weighs the various factors described above in conjunction with the required bandwidths for different portions of the media asset. In other words, the download agent first determines the required bandwidths for different portions of the media assets. Based on the characteristics of the source servers, e.g., the factors described above, the download agent selects source servers from which the download agent downloads media content.

The download agent initially downloads the metadata, in examples where the metadata is separately available. The download agent may request for the initial portion of the media file that contains the metadata or may request to download the metadata from at least one of the source servers. In examples where the metadata is separately stored on the source servers, the download agent may download the metadata only from one source server instead of from a plurality of source servers because the metadata is generally very small. Based on the metadata, the download agent calculates the required bandwidths for different portions of the media asset.

In accordance with this disclosure, based on the required bandwidth, the download agent determines how much of the media content should be downloaded from which servers and at what time. To compute the bandwidth requirements for portions of the media asset the download agent first determines the starting and ending byte offsets for the portion of the media asset and the starting and ending portion of timestamps for the portion of the media asset. The download agent then subtracts the starting byte offset from the ending byte offset to calculate the total bytes in the portion. The download agent subtracts the starting timestamp from the ending timestamp to calculate the total duration of the portion. The download agent multiplies the total byte in the portion by eight to calculate the total bits in the portion. Download agent then divides the total bits in the portion by the total duration in the portion to calculate the required bandwidth for that portion. For example, the download agent may determine the bandwidth from 10 minutes and 30 seconds to 11 minutes of the media file calculated from the metadata. For that 30 second portion (11 minutes minus 10 minutes and 30 seconds), the download agent determines how much of that portion should be downloaded from which servers based on the factors described above that indicate the characteristics of the source servers. For example, the download agent will select source servers to minimize the costs to MCP associated with downloading that portion of media content.

As another example, if the bandwidth required to transmit a portion of the media content is low, the download agent may select paths to source servers that are geographically proximate to the client device but are experiencing low throughput rate. The download agent may select such source servers because even though the servers are experiencing low throughput rates, the amount of data that needs to be downloaded for that portion is also low. Conversely, if the bandwidth required to transmit a portion of the media content is high, the download agent may select paths to source servers that are not currently consuming large amounts of bandwidth to keep the costs low for the MCP.

In some examples where the media content is time-critical content, the bandwidth for different portions of the media content may not be available because such media content may not have been generated. As described above, for time-critical content, e.g., live data, the client device is delayed a certain amount such that the client is viewing live data that occurred prior to the now point of the live data. For time-critical content, while metadata is not available as separately downloadable or inserted at the beginning of the file, the timestamps and corresponding byte ranges or offsets for a recently encoded portion of the media content may be available as metadata within the recently encoded portion, e.g., timestamps and corresponding byte ranges or offsets for recently generated I frames, P frames, or B frames. In accordance with this disclosure, the download agent may download the metadata for a portion of the media content that has not been downloaded, e.g., metadata for recently generated I frames, P frames, or B frames. For example, the client may be viewing media content of the live event that occurred 10 seconds prior to the now point of the live event. As data for the now point of the live event becomes encoded, the download agent may download only the metadata for the recently encoded media content. The download agent does not download the actual media content just yet. Similar to non time-critical content, the download agent may first determine the required bandwidth for the just encoded media content based on the just generated I frames, P frames, or B frames. Next, based on the required bandwidth for the just encoded media content, the download agent may weigh the various factors to find the optimum download paths.

For time-critical content, certain trade offs may be necessary. The longer the client device is delayed, the more time the download agent can take to find the optimum download paths. For example, if the client device is delayed 2 minutes, the download agent may have up to 2 minutes to find the optimum download paths. However, a client device that is delayed a long time may not be desirable. For example, for a live event such a sporting event, the consumer may be predominantly concerned with the score. If the client device is delayed a long time, the consumer may prefer to access a different website where the consumer can find the instantaneous score more easily.

As described above, the metadata may not be available for time-critical content, and may be available for non time-critical content. However, in some examples where the media content is non time-critical content, the metadata may not be available. For example, the metadata may not be separately downloadable and the metadata may not be added to the beginning of the media file. Rather the metadata may only be available as headers to individual frames. In such example, the download agent may download metadata from upcoming I frames, P frames, and B frames that describe the timestamps and corresponding byte ranges for those frames. Based on the metadata, the download agent determines the required bandwidth for those frames. Based on the required bandwidth, the download agent may determine optimum download paths.

Alternatively, in some examples, the download agent may not download the metadata. Instead, the download agent may extract the metadata from downloaded frames. Based on the metadata from downloaded frames, the download agent may estimate the bandwidth of future data. For example, instead of downloading metadata from upcoming frames, the download agent may track the required bandwidth for previously received frames based on the headers of the previously downloaded frames. Based on the required bandwidth for the previously received frames, the download agent may estimate the required bandwidth for future frames. For example, if the bandwidth for the last 20 frames increased from one frame to the other, the download agent may calculate the standard deviation of the bandwidth for the last 20 frames. The download agent may then add the standard deviation to the bandwidth of the $20^{th}$ frame to estimate the bandwidth for upcoming media content. Similarly, if the bandwidth for the frames is decreasing, the download agent may calculate the standard deviation and subtract the standard deviation from the $20^{th}$ frame to estimate the bandwidth for upcoming media content. In these examples, based on the estimated bandwidth, the download agent may determine optimum download paths.

Techniques of this disclosure may provide various advantages. Techniques of this disclosure may allow a client device to download and display high quality media content without the need to rebuffer or pause the display of media content as compared to conventional systems. In conventional systems, the client device makes only one connection, e.g., a single path connection, to one source server through a network. The client device downloads the media file from the one source server at a throughput rate. When the required bandwidth to transmit a VBR encoded media file or a portion of the VBR encoded media file is greater than throughput rate of the client device, the client device is forced to stop displaying the media content and buffer media content before resuming playback. Stopping display of the media content and buffering additional media content may not be desirable to the end user and may make the content virtually unwatchable.

Moreover, as described above, in conventional systems, if the required bandwidth is greater than the throughput, the playback stops. Playback is started again with a media file that is encoded for a lower bandwidth than the previous media file. However, the media file restarts from the beginning with lower bandwidth media file. Restarting from the beginning, as forced in conventional systems, drastically reduces the enjoyment of the client. Also, the client is forced to watch a media file encoded for a lower bandwidth. Generally, media files encoded for a higher bandwidth provide higher quality viewing experience compared to media files encoded for a lower bandwidth. Accordingly, in conventional systems, the client has to restart and view lower quality video.

Additionally, a media content provider may be required to pay a network provider, e.g., an ISP, to allow the media content provider to provide the media content to client devices. The media content provider may be required to pay the network provider based on the bandwidth utilized by its source server(s). Due to the variability in the bandwidth required over a given portion of the media file, the media content provider may incur additional costs from the ISP to transmit portions of the VBR encoded media file where the required bandwidth to transmit the media file is very high.

In accordance with the disclosure, the download agent reduces or eliminates the need for the client device to stop and buffer data as well as reduces the cost incurred by the media content provider. As described above, in one non-limiting example, the client device downloads the media file from a plurality of source servers in parallel. The parallel download allows the client device to download portions of the media file simultaneously thereby building a sufficient buffer of data to withstand situations where the required bandwidth to properly receive the media file is greater than the throughput rate. Furthermore, the download agent accounts for the throughput rate from the servers. If any of the servers are experiencing low throughput rates, e.g., low throughput rates due to peak download times, and the bandwidth required to transmit the media content is high, the download agent may, for example, select source servers that are not experiencing low throughput rates so that the client device receives the media content in a timely fashion.

The download agent may also reduce the costs for the media content provider to provide the media file. For example, the download agent may forecast portions within the media file where the required bandwidth to transmit the media file is high relative to the rest of the media file. The download agent may then select paths to source servers such that downloading the media content from the source servers does not drastically increase the bandwidth utilization by any one server. In this manner the amount of bandwidth that a source server utilizes is reduced compared to conventional systems. Since the MCP typically pays one or more ISPs a fee based on the amount of bandwidth utilized by a source server, the download agent may download the media content from source servers connected to the Internet from different ISPs. For example, a first source server may connect to the Internet via a first ISP, and a second source server may connect to the Internet via a second ISP. Assume the bandwidth required to transmit a portion of the media file is 3 Mbps. The download agent may download subportions of the portion from the first and second source servers. The download agent may download a first subportion of the portion from the first source server at 1.5 Mbps, and download a second subportion of the portion from the second source server at 1.5 Mbps in parallel with the first subportion. In this manner, the download agent is receiving data at a total of 3 Mbps; however, the bandwidth utilized by any of the servers is only 1.5 Mbps. In conventional systems, a single source server connect to the Internet from a single ISP may be required to consume 3 Mbps of bandwidth to provide the portion of the media content. Since the bandwidth utilized on the first and second source ISPs is 1.5 Mbps in accordance with this disclosure, the cost to the MCP may be less than 3 Mbps bandwidth that is utilized by a single source server in conventional systems.

FIG. 1 is a schematic diagram illustrating an exemplary system 2 for transmitting media content. System 2 includes a media content provider (MCP) 7, source server 5A-5N (collectively source servers 5), service provider (SP) 3A-3N (collectively service providers 3), network 8, delivery information server 10, and client device 4. Client device 4 may be a wide variety of different types of devices. For example, client device 4 may be a personal computer, a laptop computer, a mobile telephone, a personal media player, a device integrated into a vehicle, a network telephone, a network television, a television set-top box, a network appliance, or another type of network device.

MCP 7 may be an enterprise or other organization. For example, MCP 7 may be a corporation that runs a web site that allows users to post and share video clips. MCP 7 operates source servers 5. Each one of source servers 5 may be located in different geographic locations throughout the world. For example, source server 5A may be located in Minneapolis, Minn., source server 5B may be located in Los Angeles, Calif., and source server 5N may be located in Tokyo, Japan.

Source servers 5 store media content such as VBR video. The media content is stored as media files on source servers 5. The media file may comprise a plurality of media assets. As used in this disclosure, a "media asset" is a set of media data that client device 4 can download and play back via a media player. Each media asset may be individually accessible and storable. Example media assets include video clips, audio clips, movies, live audio streams, live video streams, teleconference streams, telephone streams, digital cinema feeds, and other types of media. Examples of media players include Windows Media Player™ or Silverlight™ from Microsoft Corporation of Redmond, Wash., Quicktime™ from Apple Computer of Cupertino, Calif., and Flash Video™ from Adobe Systems, Inc. of San Jose, Calif.

Source servers 5 transmit media content to client device 4 via network 8. To transmit data via network 8, MCP 7 contracts with each one of service providers 3 to allow source servers 5 to transmit media content via network 8. For example, MCP 7 may contract with service provider 3A to allow source server 5A to transmit media content to client device 4 via network 8. Similarly, MCP 7 may contract with service provider 3B and 3N to allow source server 5B and source server 5N to transmit media content to client device 4 via network 8, respectively. Because of the different geographic locations of source servers 5, MCP 7 may need to contract with different service providers to allow source servers 5 to transmit the media content to client device 4.

As shown in FIG. 1, each one of source servers 5 is connected to different service providers 3. However, in some examples, two or more source servers 5 may be connected to a same service provider 3. For example, though not shown in FIG. 1, source server 5C and source server 5D may be connected to service provider 3C. In such an example, MCP 7 contracts with service provider 3C to allow both source server 5C and 5D to transmit media content to client device 4 via network 8. Furthermore, though not shown in FIG. 1, two or more source servers 5 may be part of a common autonomous system.

Source servers 5A-5N transmit media content via its corresponding network access link 9A-9N (collectively network links 9) to its corresponding service provider 3A-3N. Network links 9 may be a T3 line as one example. Each one of network links 9 may be one dedicated link to its corresponding service provider 3, or may be a plurality of links from its source server 5 to its service provider 3.

Service providers 3A-3N provide service provider network infrastructure 11A-11N to forward the media content to network 8. Service providers 3 may be for example ISPs. The bandwidth that each one of source servers 5 utilizes to transmit media content through its corresponding network link 9 to its service provider 3 is referred to as the bandwidth utilization of that source server. The rate at which each one of source servers 5 transmits media content is referred to as the throughput rate of that source server.

Network 8 may be a wide variety of different types of networks. For example, network 8 may be the Internet, a content delivery network, a wide-area network, or another type of network. In some situations, MCP 7 does not own or control network 8. In such situations, service providers 3 own and control network 8. As noted above, MCP 7 makes contracts with service providers 3 to allow source servers 5 to provide media assets to client device 4 via network 8 and possibly one or more additional intermediate networks. For example, MCP 7 makes contract to lease network line 11A to allow source server 5A to transmit media content onto network 8. Similarly, MCP 7 makes contract to lease network line 11B and 11N to allow source server 5B and 5N to transmit media content onto network 8, respectively. In return, service providers 3 charge MCP 7 money for use of network 8. Each one of service providers 3 may charge MCP 7 based on the bandwidth utilization of network 8 by corresponding source servers 5. For example, service provider 3A charges MCP 7 based on the bandwidth utilization of network link 9A by source server 5A. Generally, service providers 3 charge MCP 7 a higher price for high bandwidth utilization, and a lower price for low bandwidth utilization. In one example, network 8 represents one or more high-speed network access links or other network connections provided and maintained by service providers 3 and leased by MCP 7.

Each one of service providers 3 may charge MCP 7 based on the "95/5" rule. In accordance with the 95/5 rule, each one of service providers 3 determines the overall bandwidth utilization over network link 9 by its corresponding source server 5 operated by MCP 7 at certain time intervals over a billing period. As a first example, service provider 3A determines the number of bits transmitted by source server 5A during a 5 minute interval. Service provider 3A divides the number of bits transmitted by source server 5A during the 5 minute interval by 5 minutes to determine an overall bandwidth utilization by source server 5A. Service provider 3A then stores the determined overall bandwidth utilization as one sample. Service provider 3A repeats this step every 5 minutes over a billing period. A billing period may be a month of time.

As a second example, every 5 minutes service provider 3 determines the number of bits transmitted during the last second. Service provider 3A multiplies the determined number of transmitted bits by 300 to estimate the number of bits transmitted during a 5 minute interval (300 seconds in 5 minutes). Service provider 3A divides the estimated number of bits transmitted during a 5 minute interval by 5 minutes to calculate a sample of the overall bandwidth utilization during the 5 minute interval. Service provider 3A repeats this step every 5 minutes over a billing period, i.e. a month.

Generally, service provider 3A performs the steps of the first example. In either example, service provider 3A then uses the samples of the overall bandwidth utilization to identify the $95^{th}$ percentile of the overall bandwidth utilization. Service provider 3A charges MCP 7 based on the bandwidth utilization of source server 5A of the identified $95^{th}$ percentile.

For example, assume service provider 3A charges MCP 7 monthly. Over a 30 day period, service provider 3A samples the overall bandwidth utilization of source server 5A every 5 minutes. This yields to 8640 samples of the overall bandwidth utilization (30 days multiplied by 24 hours per day multiplied by 60 minutes per hour divided by 5 minutes per sample). Service provider 3A disregards 432 samples that correspond to when source server 5A had the highest overall bandwidth utilization (8640 multiplied by 0.05). Service provider 3A determines the highest overall bandwidth utilization in the remaining 8208 samples, i.e. the $95^{th}$ percentile, (8640 samples minus 432 samples) and charges MCP 7 based on the determined highest overall bandwidth utilization in the remaining 8208 samples, i.e. the $95^{th}$ percentile of the overall bandwidth utilization. The sample rate of 5 minutes and the time period of 30 days is just one example. Service providers 3 may sample the overall bandwidth utilization at different time intervals and the time period may be different as well. Also the 95/5 rule is one example; each one of service providers 3 may have a different contract with MCP 7. For example, service provider 3A may charge MCP 7 based on the $90^{th}$ percentile of the overall bandwidth utilization instead of the $95^{th}$ percentile of the overall bandwidth utilization of source server 5A, while service provider 3B may charge MCP 7 based on the $95^{th}$ percentile of the overall bandwidth utilization of source server 5B.

Client device 4 downloads media assets via network 8. To download a media asset client device 4 may output a request for the media asset to delivery information server 10. The request may specify a resource identifier of the media asset. For example, client device 4 outputs a HTTP request that specifies a Uniform Resource Locator (URL) of the media asset. Delivery information server 10 may or may not be operated by MCP 7. For example, delivery information server 10 may be operated by a third party. In other words, delivery information server 10 may be operated by a service that is independent of MCP 7. Delivery information server 10 is shown for illustration purposes only. In examples where delivery information server 10 is not necessary, client device 4 may output a request for the media asset from one or more of source servers 5.

Delivery information server 10 may be configured to implement a data transfer policy established by MCP 7 for each one of service providers 3. The data transfer policy may indicate a desired overall bandwidth utilization for a billing period. As one example, a data transfer policy may indicate that MCP 7 wants to maintain an overall bandwidth utilization of 100 mega-bits per second for the billing period for service provider 3A, an overall bandwidth utilization of 500 mega-bits per second for the billing period for service provider 3B, and so on. There may be other types of data transfer policies as well.

Referring back to the media file comprising media assets stored on source servers 5, in the context of video, each media asset of a VBR video contains a plurality of frames in accordance with a video compression scheme. One such frame is referred to as a key frame or intra (I) frame that can be decoded without reference to other frames and may, for example, provide an entire encoded picture. The term "key frame" is used herein to generally refer to this type of frame within an encoded media stream. Other types frames that may be encoded within the stream include predicted (P) frame or bi-predicted (B) frame that generally contain image data and motion vector displacements that are relative to a previous key frame in the stream. A timestamp may be associated with each key frame. The timestamp indicates a temporal location of a key frame within the media asset.

The media file may be generated based on variable bit rate (VBR) encoding. In VBR encoding, different portions of the media assets may be encoded to different amounts of bandwidth for the transmission. The bandwidth of the media file refers to the amount of data per unit of time of the media file, e.g., bits per second of the media file, that needs to be transmitted for a computing device to properly render the media file. For example, a VBR video may be encoded for higher bandwidth during dynamic video, e.g. rapid visual change, and encoded for lower bandwidth during less dynamic video, e.g. minimal visual change.

The bandwidth required to transmit the VBR video may be different at different portions. The bandwidth for the different portions may be represented as a portion average bandwidth. The portion average bandwidth is the required average bandwidth over a portion of the media file. The media file may be divided down into portions. For example, a three hour VBR video may be divided down into three hundred and sixty thirty second portions. Thirty second portions is just one example. The VBR video may be divided down by more or less than thirty seconds. The VBR video may be divided to portions of approximately 300 milliseconds (ms) to 500 ms. Furthermore, the portion need not be limited to temporal portions, e.g. thirty seconds. In some examples, the portion may be defined as a number of frames within the media asset.

There may be at least two types of media assets: non time-critical content and time-critical content. For non time-critical content, the entire content is generated and stored on the servers. Examples of non time-critical content include movies, non-live television shows, web episodes, online media content found on websites like YouTube, and the like. The non time-critical content may be encoded for different bandwidths, e.g., bit rate, at different portions within the media file.

For time-critical content, the entire content may be not generated and stored on the servers 5. Rather, the time-critical content may be generated as the event is occurring. For example, all the media content may not be fully generated for a live performance that has not finished. During a live performance, the media content for the live performance is being generated simultaneously as the live performance is occurring. Such media content may be referred to as time-critical content. Examples of time-critical content include live concerts, sporting events, live news feeds, and the like. The time-critical content may be encoded for different bandwidths, e.g., bit rates, at different portions.

Copies of the media assets may be stored on each of the plurality of source servers 5. One of the source servers 5 may function as a primary server and the other source servers 5 may function as mirror servers. For non time-critical content, the media assets may be stored on any of the servers (preferably the primary server). At regularly scheduled times (preferably during non-peak download times such as midnight), each source server 5 may compare with other source servers 5 to see if there is new data on any of the servers. If there is new data, each source server 5 may copy the new data from the other servers. In this manner, each source servers 5 contains copies of the media assets.

For time-critical content, e.g., data from a live event, the source server 5 functioning as the primary server may receive encoded video frames of the live event. Alternatively, the primary server may receive raw data of the live event and may include an encapsulator that encodes the raw data into video frames of the live event. As soon as a new frame is generated, the primary server multicasts the data to the other source servers 5 functioning as mirror servers. The mirror servers may receive and store the live data. The delay from when the primary server stores the just encoded video frames and when the mirror servers receive the just encoded video frames may be very small. Accordingly, the mirror servers may be updated with frames of the live event virtually instantaneously.

In some examples, in addition to the media assets, one or more of the source servers may also store metadata. The metadata comprises a listing of playback timestamps, i.e., temporal locations, and corresponding byte ranges or offsets. For example, the metadata may indicate the number of bytes that need to be transmitted every 500 ms, e.g., the number of bytes that need to be transmitted from 1 ms to 500 ms, 501 ms to 1000 ms and so on. The 500 ms temporal locations are provided for illustration purposes only. Different examples may include larger or smaller intervals. The metadata may be stored at the beginning of the media file, or may be stored separately.

For non time-critical content, the metadata may be generated and stored on one or more of the servers. However, for time-critical content, the metadata may not be generated and stored because some of the media content is yet to be generated. For example, for a live event like a sporting event, the media content is generated as the live event occurs, and obviously it is impossible to generate media content for instances that are yet to occur. In such situations the metadata that indicates the timestamps and corresponding byte ranges may be stored as a header within just generated video frames.

As described so far, a plurality of source servers store portions of a media file referred to as media assets. The media assets may be generated based on VBR coding techniques. In some examples, the media assets may additionally include metadata that includes a listing of playback timestamps and corresponding byte ranges. Alternatively, the metadata may be stored separately on one or more source servers. In some examples, the metadata may be stored within a header of a generated video frame.

Referring back to client device 4, client device 4 may download the media assets from one or more of source servers 5 in parallel or sequentially from different source servers 5. Client device 4 may establish different paths, e.g., sockets, to source servers 5. For example, as shown in FIG. 1, the path from client device 4 through link 11A and 9A to source server 5A may be considered a first path. The path from client device 4 through link 11B and 9B to source server 5B may be considered a second path and so on. One example technique of downloading the media assets in parallel is described in application Ser. No. 10/788,695, entitled "PARALLEL DATA TRANSFER OVER MULTIPLE CHANNELS WITH DATA ORDER PRIORITIZATION," filed Feb. 27, 2004, which claims priority to 60/451,295, filed Feb. 28, 2003, the entire contents of each is incorporated herein by reference.

Client device 4 may divide source servers 5 into super data source groups and data source groups. Data source groups may be a grouping of source servers 5 that may be close in geographic proximity to each other. For example, if source server 5A and 5B where in geographic proximity to one another, source server 5A and 5B may be in the same data source group. Client device 4 may determine the proximity of source servers 5 based on their respective IP addresses, as one example. Furthermore, source servers 5 in the same data source group may be accessible via the same transport protocol. For example, source server 5A and 5B may both be accessible using Hypertext Transfer Protocol (HTTP). Source servers 5 within data source groups may dynamically change. For example, some of source servers 5 within a data source group may become unavailable while client device 4 is downloading data. Similarly, some of source servers 5 may be added into the data source group while client device 4 is downloading data. In some examples, when data is requested from source servers 5 of a common data source group, the same source server 5 may provide data unless that source server 5 indicates that it cannot handle requests for data.

Super data source groups comprise data source groups that are indistinguishable based on their billing contracts, e.g., 95/5 billing contracts. For example, assume source server 5C and 5D (not shown in FIG. 1) comprise a first data source group and source server 5E and 5F (not shown in FIG. 1) comprise a second data source group. If source servers 5C, 5D, 5E, and 5F contract with a same ISP to provide data on to network 8, then the first data source group and the second data source group may be included in a super data source group. Source servers 5C, 5D, 5E, and 5F may be considered to be in a super data source group because the bandwidth utilized by the source servers may fall under the same billing contract between MCP 7 and the ISP. Client device 4 may determine which source servers 5 provide data through a common ISP based on their respective IP addresses, as one example. In some examples, source servers 5 in a super data source group may be on a common autonomous system (AS).

To download the media assets, client device 4 may weigh various factors. The various factors may be the characteristics of source servers 5. The characteristics may include availability of source servers 5, peak download times of source servers 5, geographic location of the source servers 5, the privilege level of client device 4, client-side autonomous system (AS) number, bandwidth utilization for billing of source servers 5, e.g., 95/5 billing, and the like. Some of the characteristics such as peak download times and bandwidth utilization may require input from source servers 5.

Client device 4 may weigh the factors based on characteristics of the different paths to source servers 5. Client device 4 may monitor the characteristics of the data flowing from each of the different paths using an internal flow manager. The flow manager may be responsible for starting the download of media assets from the various paths, cancelling the download of media assets from the various paths, and determining how much of media file should be downloaded from which source servers 5 and at what time. The flow manager represents the paths to the sources as an inverted tree having a plurality of nodes arranged into different levels.

To monitor the characteristics of the data flowing into client device 4, the flow manager of client device 4 may maintain a data structure to represent the paths to the sources as an inverted tree having a plurality of nodes arranged into different levels. A single "data flow" comprises the flow of a particular range of bytes of a portion of media content from one of source servers 5. There may be many such data flows that may be executed by and managed by the flow manager of client device 4 over the course of a download. In one embodiment, the inverted tree has four levels used to determine the flow characteristics. The four levels of nodes, starting from bottom to top, may comprise flow channel nodes, data source group nodes, super data source group nodes, and a root node. Each node is used as a data structure to track the number of bytes received at that node as well as the rate at which those bytes are received (e.g., the throughput rate of the received bytes). A node at a given level may contain aggregate data for all the nodes below it. Accordingly, a root node for the tree may provide a continuous value for the total throughput of the system, e.g., the total throughput rate at which client device 4 receives the data.

The leaf nodes of the tree are flow channel nodes, and each flow channel node may represent the actual path (flow channel) to a respective source servers 5. For example, a first flow channel may be a path to source server 5A, a second flow channel may be a path to source server 5B, and so on. The data coming through the flow channels, e.g., media assets or parts of media assets, may be inspected for correct semantics. If there is error in the data from a particular flow channel, that flow channel may be designated as failed, and no additional data may be downloaded via that particular flow channel. There may be one or more flow channels associated with each data source node. For example, a first and second path may be associated with a first data source group node, and a third and fourth path may be associated with a second data source group node. The downloaded data from the flows may be propagated to their corresponding data source group node.

At the next level up the tree, each data source group node is used to collect runtime data from each flow channel associated with the data source group node. For example, the data source group node may collect timing estimators, e.g., estimate of how long it took to receive the data, throughput rate, number of bytes received for each flow channel. In some examples, the data source group node may also collect data such the amount of bandwidth utilized by the various source servers 5.

Client device 4 maintains state data representing its monitoring of source servers 5. For each source server 5, each corresponding data source group node stores data indicating a state of: untested, test pending, untested retry, available, unavailable retry, available busy, and unavailable. Client device 4 may determine the status of each of source servers 5 as described in detail in the disclosure with respect to FIG. 3. Generally, client device 4 finds source servers 5 that are in the available state. Source servers 5 that are in the available state may be suitable source servers 5 from which client device 4 downloads media content.

The super data source group node is a parent to the one or more of the data source group nodes. At the super data source group node, client device 4 determines the number of bytes received from each of the data source group nodes and the throughput rate of the source servers 5. All the data from the other nodes, e.g., flow channel, data source group, and super data source group, may be ultimately funneled to the root node. Accordingly, the root node may contain information regarding the status of source servers 5, e.g., state of source servers 5, the throughput rate of source servers 5, and which source servers 5 should be downloaded from and at what time. The root node may also receive information about the total throughput rate, e.g., the summation of the throughput rate of each of source servers 5.

Client device 4 may utilize the number of bytes received from each of the data source group as recorded in the corresponding source group nodes of the inverted tree data structure along with the availability of each of the source servers 5 and the throughput rate of each of the source servers 5 to determine optimal path choices. For example, as described above, in some examples, client device 4 calculates the required bandwidth for different portions of the media file for non time-critical content. Client device 4 may select source servers 5 such that the total throughput rate is greater than the required bandwidth for a portion of the media asset. In some examples, client device 4 may also factor for time of day, e.g., peak download times of source servers 5, geographic location of the source servers 5, source servers 5 that are in a common AS, 95/5 billing characteristics, and the like.

For example, client device 4 may initially find suitable source servers 5 to download portions of media assets from based on the determined required bandwidth of the portion of the media asset, the availability of the source servers 5, and the throughput rate of the source servers 5. Next, client device 4 may select a plurality of source servers 5 from the suitable source servers 5 from which to download the media assets. To select the plurality of source servers 5 from the suitable source servers 5, client device 4 may select source servers 5 that are geographically proximate to client device 4, as one example. As another example, client device 4 may select source servers 5 that are in the same AS as client device 4. As yet another example, client device 4 may select source servers 5 that are capable out outputting additional bytes without incurring additional costs under the 95/5 billing contract.

In some examples such as time-critical content, as described above, the entire metadata may not be separately downloadable or inserted at the beginning of the media file. Rather, the metadata may only be available as the frames are generated. In examples where the media content is time-critical content, client device 4 may be delayed a few seconds such that client device 4 is displaying media content that occurred a few seconds prior to the now point of the media file. In such examples, client device 4 may download only the metadata from just encoded frames that includes the timestamps and corresponding byte ranges or offsets but may not download the actual content of the just encoded frames. Client device 4 may then utilize the metadata calculate the required bandwidth of the just encoded frames. Client device 4 utilizes the required bandwidth of the just encoded frames to determine which source servers 5 client device 4 should download those just encoded frames.

Alternatively, in some examples such as time-critical content, client device 4 may not download the metadata for just encoded frames whose content is yet to be downloaded. Instead, client device 4 may track the required bandwidth for previously downloaded frames to estimate the bandwidth for the future frames. Client device 4 may average the required bandwidth for the previous frames and calculate the standard deviation. Client device 4 may then add the standard deviation to the average bandwidth to estimate the bandwidth for media assets that are yet to be downloaded.

For time-critical content, certain tradeoffs may be necessary. The longer client device 4 is delayed (backset from the now point of live data), the longer client device 4 has to determine optimum paths to download the content of the just encoded media asset. However, long delays may not be ideal because the consumer using client device 4 may choose to receive information for a different website. For example, if the consumer is specifically interested in the score of a game, that consumer may choose to download the score from a different website that is providing the score instantaneously.

As described above, the flow channel node, data source group node, super data source group node, and root node information is ascertained by client device 4. However, in some examples, client device 4 may not ascertain such information. Instead, delivery information server 10 may ascertain all such information, e.g., flow channel node, data source group node, super data source group node, and root node information. In such examples, delivery information server 10 may also download metadata to calculate the required bandwidth for the portions of the media asset when such metadata is available. For example, for non time-critical content, delivery information server 10 may download the metadata from at least one of source servers 5. Delivery information server 10 calculates the required bandwidth of the media asset from the metadata. As another example, for time-critical content, delivery information server 10 may download metadata from upcoming frames not yet downloaded and calculate the required bandwidth for the upcoming frames. As yet another example, delivery information server may track the required bandwidth for the received media assets and estimate the required bandwidth for media assets not yet downloaded based on the required bandwidth of the received media assets.

In such examples, client device 4 may transmit a request to delivery information server 10 requesting media assets. In response, delivery information server 10 may determine the optimum source servers 5 from which client device 4 should download. Delivery information server 10 may transmit the URL for the media assets from the optimum source servers 5 to client device 4. In turn, client device 4 may request for the media assets from the suitable source servers 5 determined by delivery information server 5.

Notably, delivery information server 10 may not be necessary in all examples, and is provided for illustration purposes only. Particularly, delivery information server 10 may not be needed for system 2 to function properly. As described above, client device 4 may determine optimal source servers 5 from which to download portions of the media assets. Delivery information server 10 may be another device that determines optimal source servers 5 from which to download portions of the media assets. Delivery information server 10 may be utilized in examples where client device 4 cannot determine optimum source servers 5 from which to download portions of the media assets.

Figure 2:
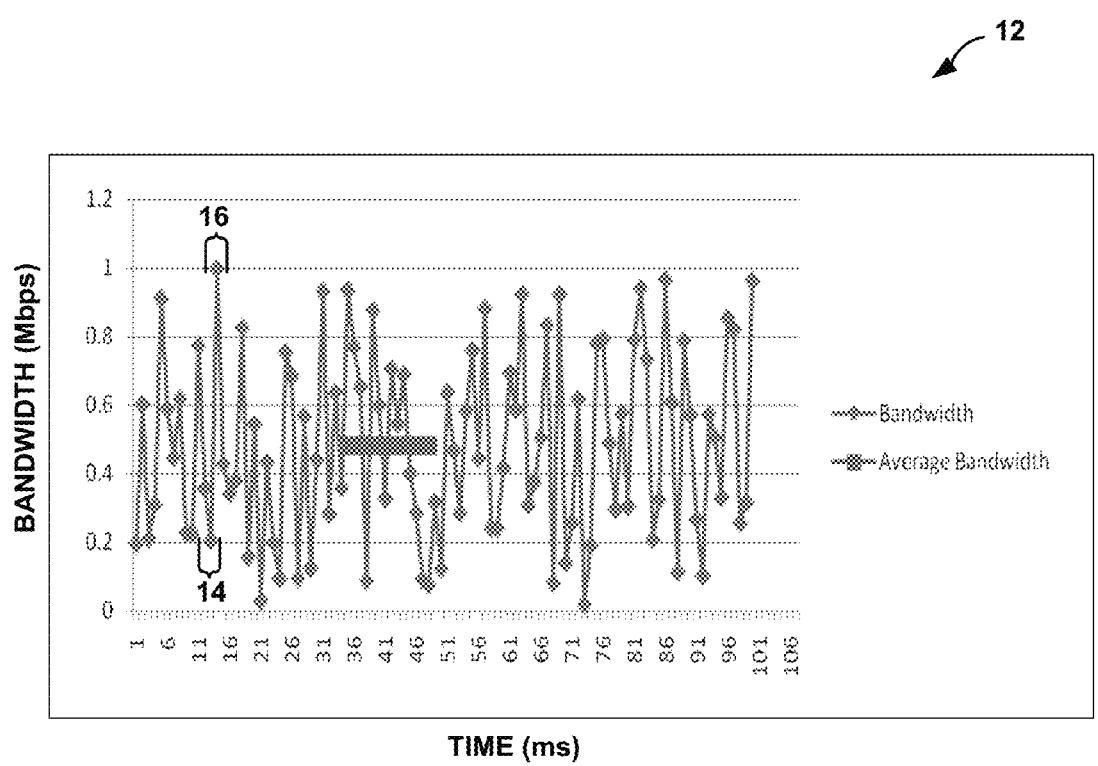
FIG. 2 is a graph illustrating an example bandwidth requirement of an exemplary non time-critical content media asset.

FIG. 2 is a graph illustrating an example bandwidth requirement of an exemplary non time-critical content media asset 12. In this example, media asset 12 has been encoded for an overall average bandwidth of 0.5 Mbps. However, as seen in FIG. 2, there are portions of media asset 12 where the bandwidth requirements may be greater or less than the overall average bandwidth. For example, at portion 14, e.g., 10 ms to 12 ms, the required bandwidth to transmit encoded portion 14 is down to 0.2 Mbps. At portion 16, e.g., 12 ms to 16 ms, the required bandwidth is approximately 1 Mbps which is 50% greater than the overall average bandwidth.

Client device 4 downloads the metadata and predictively computes the bandwidth necessary for downloading the encoded content at different portions (e.g., playback time periods) of media asset 12. As described above, client device 4 continuously monitors the status of source servers 5 (FIG. 1). Based on the calculated bandwidth requirements for each portion and the monitored status of the source servers 5, client device 4 determines the specific byte ranges of media asset 12 that should be downloaded from which source servers 5. For example, as shown in FIG. 2, at portion 16, the bandwidth to transmit the encoded content is approximately 1 Mbps. Client device 4 may select multiple appropriate flow channels, e.g., paths, to suitable source servers 5 to download this portion in parallel due to the high bandwidth requirement, as one non-limiting example. Alternatively, client device 4 may select multiple appropriate flow channels and download subportions of this portion sequentially from the different suitable source servers 5.

For example, assume that client device 4 is forecasting how portion 16 should be downloaded. Client device 4 may initially determine that a throughput rate of at least 1 Mbps throughput rate is necessary to properly download the portion 16 which has a bandwidth requirement of 1 Mbps. As described above, client device 4 continuously monitors the status of source servers 5. During that monitoring, client device 4 may determine that the path to source server 5A has a current throughput rate of 0.75 Mbps. In some examples, client device 4 may also determine that source server 5A is currently in a non-peak download time and is located within the same AS as client device 4. Similarly, during the monitoring, client device 4 may determine that source server 5B has a current throughput rate of 0.25 Mbps. In some examples, client device 4 may also determine that source server 5B is currently in a non-peak download time and is in the same AS as client device 4. Furthermore, client device 4 determines that source server 5A cannot provide a lot of additional data without incurring additional costs due to the 95/5 billing requirements. Accordingly, though source server 5A has higher throughput rates than source server 5B, client device 4 may determine that it is better to download some of portion 16 from source server 5A and some of portion 16 from source server 5B so that MCP 7 does not incur additional costs. In one example, client device 4 downloads some of portion 16 from source server 5A and some of portion 16 from source server 5B simultaneously, e.g., in parallel. In another example, client device 4 downloads some of portion 16 from source server 5A and then downloads some of portion 16 from source server 5B. In this example, client device 4 downloads the data in accordance with multisource downloads.

To download portion 16 for the playback period of 12 ms to 16 ms, client device 4 distributes the portion across the selected servers 5 based on their current throughput rate. For example, client device 4 may request data of media asset 12 for the playback period of 12 ms to 15 ms from source server 5A. Client device 4 may also request data of media asset 12 for the playback period of 15 ms to 16 ms from source server 5B as the throughput rate of source server 5B is currently one fourth that achieved by source server 5A. To make the request, client device 4 may first determine the byte ranges for the time ranges. For example, client device 4 may determine that 12 ms to 15 ms comprises bytes 101-400 and 15 ms to 16 ms comprises bytes 401-500. For example, client device 4 may output a request to source server 5A from a socket dedicated to source server 5A stating GET/media/video_asset12flv HTTP/1.0 Range: bytes=101-400. Client device 4 may output a request to source server 5B from a socket dedicated to source server 5B stating GET/media/video_asset12.flv HTTP/1.0 Range: bytes=401-500. In response, source server 5A identifies the data of media asset 12 corresponding to the playback time of 12 ms to 15 ms and transmits that data to client device 4. Similarly, source server 5B identifies the data of media asset corresponding to the playback time of 15 ms to 16 ms. Generally, source server 5A and 5B may find key frames that are substantially close to 12 ms, 15 ms, and 16 ms and transmit the data between these key frames so as to include data for at least the requested playback period. However in some examples, source server 5A and 5B may include timestamps for more than just the key frames. In such examples, source server 5A and 5B may transmit the exact data between 12 ms to 15 ms and 15 ms to 16 ms, respectively.

As described above, the throughput rate of source server 5A is 0.75 Mbps which is 3 times the throughput rate of source server 5B, e.g., 0.25 Mbps. Accordingly, client device 4 requests 3 times as much data from source server 5A than from source server 5B, e.g., 3 ms from source server 5A and 1 ms from source server 5B. In this manner, client device 4 receives portion 16 from different source servers 5 in parallel. In this case, the source server 5A and 5B may be considered part of a balanced flow tree because all flows, e.g., socket paths, are received by client device 4 in a way that maintains the desired condition of receiving 75% of the data from source server 5A and 25% of the data from source server 5B. In another example, client device downloads 3 times as much data from source server 5A and then downloads the remaining the data from source server 5B.

Figure 3:
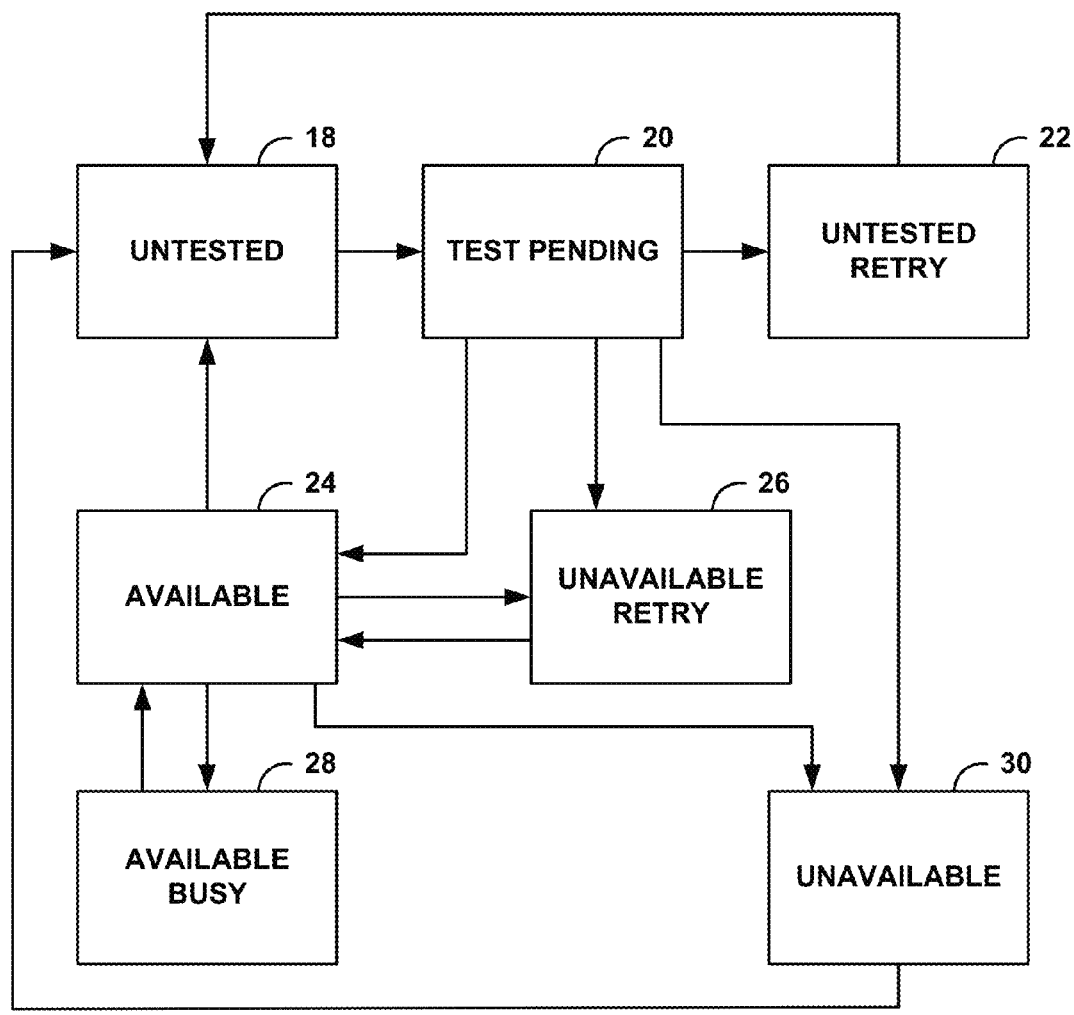
FIG. 3 is a state diagram illustrating the various states maintained by a client device for a source server within data stored within the nodes of the flow tree.

FIG. 3 is a state diagram illustrating the various states maintained by client device 4 for source server 5A within data stored within the nodes of the interval tree. Though the disclosure describes the various states maintained by client device 4 for source server 5A, client device 4 also maintains the states for all source servers 5 as described herein. Client device 4 may consider source server 5A in a state of:

untested 18, test pending 20, untested retry 22, available 24, unavailable retry 26, available busy 28, and unavailable 30. Initially, client device 4 may consider source server 5A in untested state 18. Before source server 5A can output media assets, client device 4 may ensure that source server 5A is capable of providing data. For client device 4 to consider source server 5A in the test pending state 20, source server 5A may be required to transmit a transmission probe down the channel (e.g., socket) to client device 4. The probe may be a relatively small, low priority portion of the media content. The term low priority should be interpreted to mean data that is as far away as possible from the current location of the media file that is being consumed by client device 4. To initiate the probe, client device 4 outputs a request to receive the probe from source server 5A. The probe may be a sequence of one or more packets carrying data, such as 15 kilobytes of data, transmitted to client device 4 from source server 5A over the established socket. During the probing of source server 5A, source server 5A is considered by client device 4 to be in test pending state 20. After successfully receiving the probe, client device 4 updates the data within the tree data structure to transition the source server 5 into available state 24. Based on the rate at which the probe is received, client device 4 may determine the throughput rate of that source server 5.

If the transmission of the probe from source server 5A fails in a non-fatal manner, that client device updates the state data for source server 5A to transition the state to untested retry state 22 for a short period of time, e.g., a small number of seconds. The short period of time when client device 4 considers source server 5A in untested retry state 22 may be referred to as a short timeout. After the elapse of the short timeout, client device 4 updates the state data to return to untested state 18 with respect to source server 5. After returning to untested state 18, client device 4 tests that source server 5 again. The short timeout where client device 4 considers source server 5A in untested retry state 22 exponentially increases as client device 4 cycles source server 5A through untested state 18, test pending state 20, and untested retry state 22. For example, the short timeout when client device 4 considers source server 5A in untested retry state 22 may initially be 0 seconds. After the client device 4 transitions source server 5A to untested state 18, client device 4 then transitions source server 5A to test pending state 20. If source server 5A again fails in a non-fatal manner, client device 4 transitions the source server 5 to untested retry state 22 and remain in that state for 5 seconds, instead of the initial 0 seconds.

If the transmission of the probe from source server 5A fails in a fatal manner, client device 4 transitions source server 5A to unavailable state 30. Client device 4 considers source server 5A in unavailable state 30 for long period of time, e.g., a small number of minutes. The long period of time may be referred to as long timeout. After the long timeout, client device 4 transitions source server 5A to untested state 18.

When client device 4 considers source server 5A in available state 24, if data received from source server 5A fails, client device 4 transitions source server 5A to unavailable retry state 26. Client device 4 considers source server 5A in unavailable retry state 26 for the short timeout which may be same amount of time as the short timeout for untested retry state 22. After the elapse of the short timeout, client device 4 considers source server 5A back in available state 24. Similar to untested retry state 22, the short timeout that client device 4 considers source server 5A in unavailable retry state 26 may increase as client device 4 transitions source server 5A between available state 24 and unavailable retry state 22. If client device 4 considers source server 5A in available state 24 and source server 5A is maximizing its bandwidth utilization, client device 4 transitions source server 5A from available state 28 to the available busy state 28. When source server 5A is not maximizing its bandwidth utilization, client device 4 considers source server 5A in available state 28.

Client device 4 continuously updates status of source server 5A as described. Notably, client device 4 continuously updates status of all source servers 5. For example, client device 4 continuously determines the state of the various source servers 5. In this manner, client device 4 may determine which source servers 5 are available to transmit the media assets. For example, client device 4 may open a path, e.g., a socket, to each one of source servers 5. Client device 4 may initially receive data such probe data from each of the source servers 5 to determine whether client device 4 should consider that one of source servers 5 in the available state, as one example.

When client device 4 transitions source server 5A to the unavailable or untested state, client device 4 may disable the socket, e.g., no longer provide a connection to source server 5A. Similarly, client device 4 disables sockets to other source servers 5 that client device 4 transitions to the unavailable or untested state.

In some instances, source servers 5 may need to output their own status to client device 4. For example, source server 5A that is maximizing its bandwidth utilization may need to output such information to client device 4. In response, client device 4 may determine that source server 5A should be transitioned from the available state to the available busy state. In some examples, information from source servers 5 indicating their status may be provided periodically to client device 4. In some examples, as described in more detail below, the status from source servers 5 may be transmitted to delivery information server 10.

Figure 4:
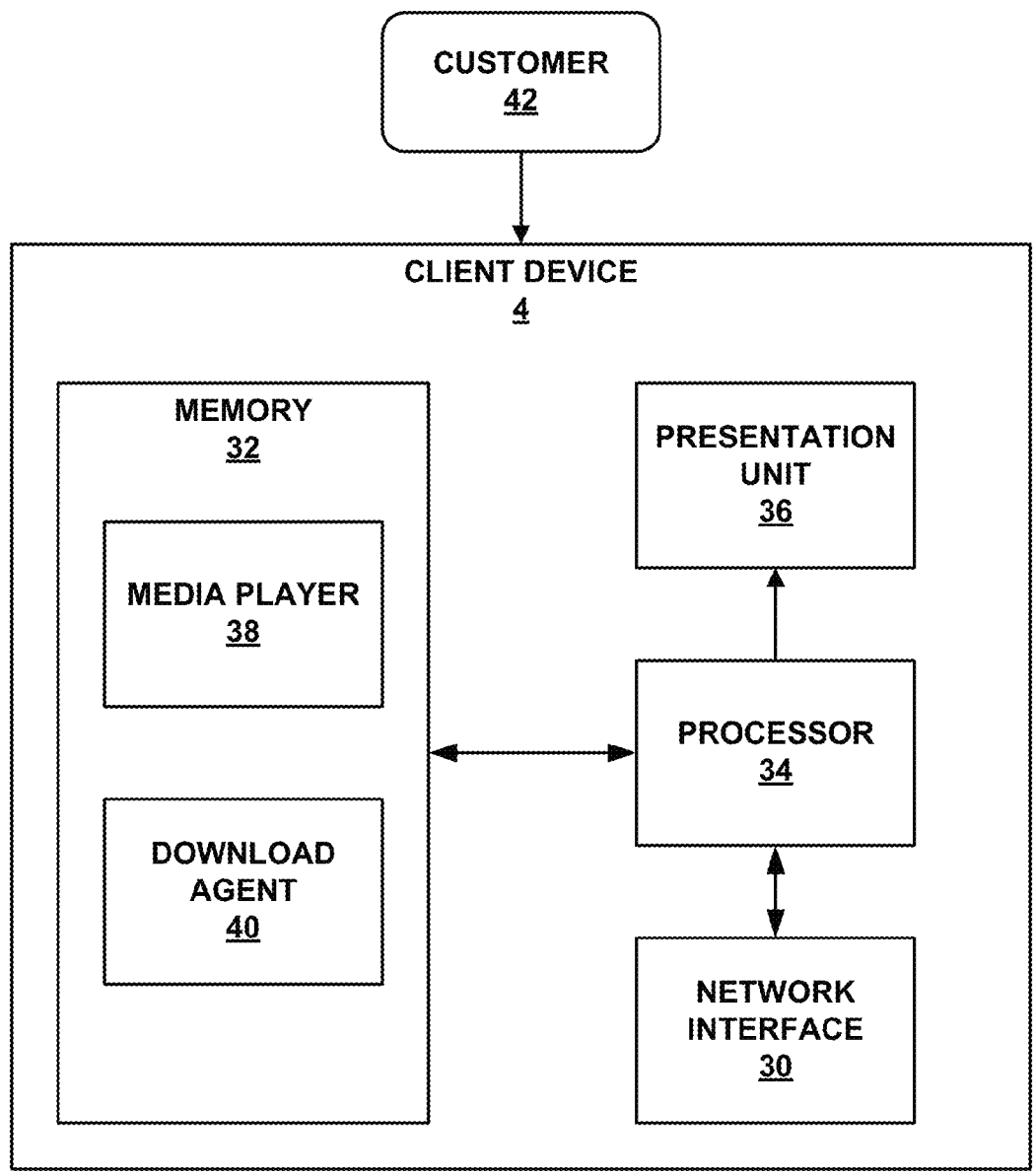
FIG. 4 is a block diagram illustrating various exemplary components of a client device.

FIG. 4 is a block diagram illustrating various exemplary components of client device 4. As noted above, client device 4 may be a wide variety of different types of devices. For example, client device 4 may be a personal computer, a laptop computer, a mobile telephone, a personal media player, a device integrated into a vehicle, a network telephone, a network television, a television set-top box, a network appliance, or another type of network device.

In the example of FIG. 4, client device 4 includes a network interface 30, a memory 32, a processor 34, and a presentation unit 36. Network interface 30 facilitates communication between client device 4 and network 8. Network interface 30 may be a variety of different types of network interface. For example, network interface 30 may be an Ethernet interface, a WiFi interface, a token ring interface, a fiber optic interface, a Bluetooth interface, a Wireless Broadband interface, a WiMax interface, or another type of network interface. Memory 32 may be a computer-readable storage medium such as a Random Access Memory unit, a disk drive, an optical disc, a floppy disk, a Flash memory unit, or another type of computer-readable storage medium. Processor 34 may be a microprocessor that includes one or more cores, an application-specific integrated circuit (ASIC), co-processor, or another type of integrated circuit. Processor 34 may execute instructions stored in memory 32. When processor 34 executes instructions stored in memory 32, the instructions may cause processor 34 to perform one or more actions. Presentation unit 36 may be a computer monitor, a television set, an integrated video screen, speakers, digital signage, a video projector, or another type of unit capable of presenting media.

In the example of FIG. 4, memory 32 includes a media player 38 and a download agent 40. Media player 38 and download agent 40 may be sets of instructions that, when executed cause processor 34 to perform various actions. For ease of explanation, when this disclosure states that media player 38 performs some action or states that download agent 40 performs some action, such phrases may be interpreted to mean that the instructions of media player 38 cause processor 34 to perform the action or to mean that the instructions of download agent 40 cause processor 34 to perform the action. However, it should be appreciated that in some implementations, media player 38 and/or download agent 40 may be implemented at least in part as hardware, in which case media player 38 and/or download agent 40 may perform some or all of the actions without any action by processor 34. Furthermore, it should be appreciated that in some implementations media player 38 and download agent 40 may be part of a common software package. In other words, the functionality of download agent 40 may be incorporated into media player 38.

Furthermore, as described above, the disclosure describes functionality performed by client device 4. Such description is provided for ease of illustration. Generally, the functions described above that are performed by client device 4 may be performed by download agent 40 within client device 4.

A consumer 42 of client device 4 may interact with media player 38 when consumer 42 wants client device 4 to present a media asset. Example commercial media player applications include Windows Media Player™ and Silverlight™ from Microsoft Corporation of Redmond, Wash., Quicktime™ from Apple Computer of Cupertino, Calif., and Flash Video™ from Adobe Systems, Inc. of San Jose, Calif. Consumer 42 may directly or indirectly instruct media player 38 to present a media asset. For example, consumer 42 may directly instruct media player 38 to present a media asset by inputting a Uniform Resource Locator associated with the media asset into a prompt presented by media player 38. In a second example, consumer 42 may indirectly instruct media player 38 to present a media asset by navigating a web browser application to a web page in which the media asset is embedded. In this second example, the web browser application may automatically instruct media player 38 to present the media asset.

When media player 38 is instructed to present a media asset, media player 38 may directly or indirectly instruct download agent 40 to retrieve the media asset. For example, media player 38 may use inter-process communication to directly instruct download agent 40 to retrieve the media asset. In another example, media player 38 may instruct an operating system of client device 4 to retrieve the media asset. In this example, the operating system may instruct download agent 40 to retrieve the media asset.

In one example, after receiving a request to download a media asset, download agent 40 may determine the status of source servers 5. For example, as described above, download agent 40 may initially determine which source servers 5 belong to a data source group and super data source group. As described above, source servers 5 that may be close in geographic proximity to each other may be in the same data source group. Super data source groups comprise data source groups that are indistinguishable based on their billing contracts. Next, download agent 40 may determine the status of each of source servers 5 in their associated data source group, e.g., the state of each of source servers 5. As described above, download agent 40 may determine the status, e.g., state, and characteristics, e.g., various factors, of source servers 5 in the flow channel node, data source group node, super data source group node, and root node.

Download agent 40 then downloads the metadata that indicates timestamps and corresponding byte ranges or offsets of the data within a media asset, in examples where such metadata is available. Based on the timestamps and corresponding byte ranges or offsets, download agent 40 calculates the required bandwidth to download various portions of the media asset. In examples where such metadata is not available, e.g., time-critical content, download agent 40 may download media assets from the source server 5 with the highest throughput rate to build some buffer of data. In such examples, client device 4 is delayed a few seconds, so media player 38 may not be displaying the now point of the time-critical content event, e.g., a live event. Download agent 40 may download the header portions that contain metadata that indicate the timestamps and corresponding byte ranges or offsets of just encoded frames and not download the actual content. Download agent 40 then calculates the required bandwidth for those encoded frames. Alternatively, download agent 40 may track the required bandwidth for previously downloaded frames. Download agent 40 may then estimate the required bandwidth of future frames based on the required bandwidth for previously downloaded frames. For example, download agent 40 may average the required bandwidth for the previously received frames and calculate the standard deviation. Download agent may then add the standard deviation to the previously received frames to estimate the required bandwidth for yet to be received frames. Download agent 40 may average the required bandwidths for all the previously downloaded frames. Or, download agent 40 may average the required bandwidth for some of the most recent downloaded frames, e.g., the previous 20 frames.

After download agent 40 determines the required bandwidth at various timestamps or byte ranges of the media asset based on the metadata, download agent 40 may utilize the required bandwidth information and the status and characteristics of source servers 5 to determine the optimum source servers 5 from which to download the media asset. In the alternate, download agent 40 may determine the required bandwidth for future frames by estimating the required bandwidth for future frames based on the required bandwidth for previous frames. Similarly, download agent 40 may then utilize the required bandwidth information and the status and characteristics of source servers 5 to determine the optimum source servers 5 from which to download the media.

In some examples, to determine which source servers 5 should be utilized to download the media assets, download agent 40 may first consider all source servers 5 that are in the available state as described with respect to FIG. 3. In other words, download agent may first determine the status source servers 5. Download agent 40 may then determine the characteristics of source servers 5 that are in the available state. Download agent 40 may evaluate the throughput rates of source servers 5, the peak download times of source servers 5, the geographic location of source servers 5, and the billing contracts, e.g., 95/5 billing characteristics of source servers 5. Some of these characteristics may compete with other characteristics. For example, source server 5A is experiencing peak download times and is geographically proximate to client device 4. Download agent 40 may account for the required bandwidth and the various factors, e.g., characteristics, to determine optimum download paths, e.g., optimum source servers 5 to download the data from.

For example, if download agent 40 determined that the required bandwidth for upcoming media content within a media asset is low compared to the rest of the media asset, download agent 40 may determine that the optimum download paths are to source servers 5 that are experiencing low throughput rates but can withstand additional bandwidth utilization without incurring additional costs under the 95/5 billing rule. As another example, if download agent 40 determined that the required bandwidth for upcoming media content within a media asset is high compared to the rest of the media asset, download agent 40 may determine that the optimum download paths are to source servers 5 that are geographically distant but experiencing low peak download times compared to source servers 5 that are geographically proximate but experiencing high peak download times. Other permutations and combinations of the characteristics associated with source servers 5 may be possible and are contemplated by this disclosure.

In some examples, download agent 40 may prefer to download media assets from source servers 5 that are in the same autonomous system as client device 4. Client device 4 may determine whether source server 5A is in the same autonomous system based on the autonomous system number of client device 4, as one example. Client device 4 may determine whether each one of source servers 5 are in the same autonomous system as client device 4. In some examples, client device 4 may be of a higher "privilege level" compared to other client devices attempting to download data via network 8 (FIG. 1). The higher privilege level may be granted based on contract fees that consumer 42 pays. The higher privilege level may allow client device 4 to download media assets from source servers 5 at a higher throughput. In other words, the higher privilege level may allow client device 4 to download media assets from source servers 5 that provide the highest throughput rate even if downloading media assets from those source servers 5 increases the costs incurred by MCP 7. In such examples, download agent 40 may account for its higher privilege level and select source servers 5 accordingly.

In some examples, instead of download agent 40 performing the functions described above, delivery information server 10 (FIG. 1) may perform substantially similar functions as download agent 28. In such examples, client device 4 may output a request to delivery information server for a media asset. In such examples, delivery information server 10 may determine the required bandwidth of a media asset that client device 4 wishes to download. Delivery information server 10 may track the status and characteristics of source servers 5.

In some examples, after delivery information server 10 determines source servers 5 from which client device 4 should download 1, delivery information server 10 outputs a request to the determined source servers 5 to output the media asset to client device 4. For example, delivery information server 10 outputs a request based on the timestamp or byte range of portions of the media asset to a plurality of source servers 5. In response, the plurality of source servers 5 transmit the requested portions of the media assets to client device 4.

Alternatively, delivery information 10 may transmit a response to client device 4 indicating which source servers 5 client device 4 should download from and how much data client device 4 should download from each of those source servers 5. For example, delivery information server 10 may output the filename and the duration of the portion that client device 4 should download from source server 5A. Delivery information server 10 may also output the filename and the duration of the portion that client device 4 should download from source server 5B.

As described above, in some examples, delivery information server 10 may perform steps substantially similar to those of download agent 40 described above. In such examples, download agent 40 may only receive the portions of the media asset. However, delivery information server 10 may not be necessary in all examples. Delivery information server 10 is provided only for illustration purposes.

Figure 5:
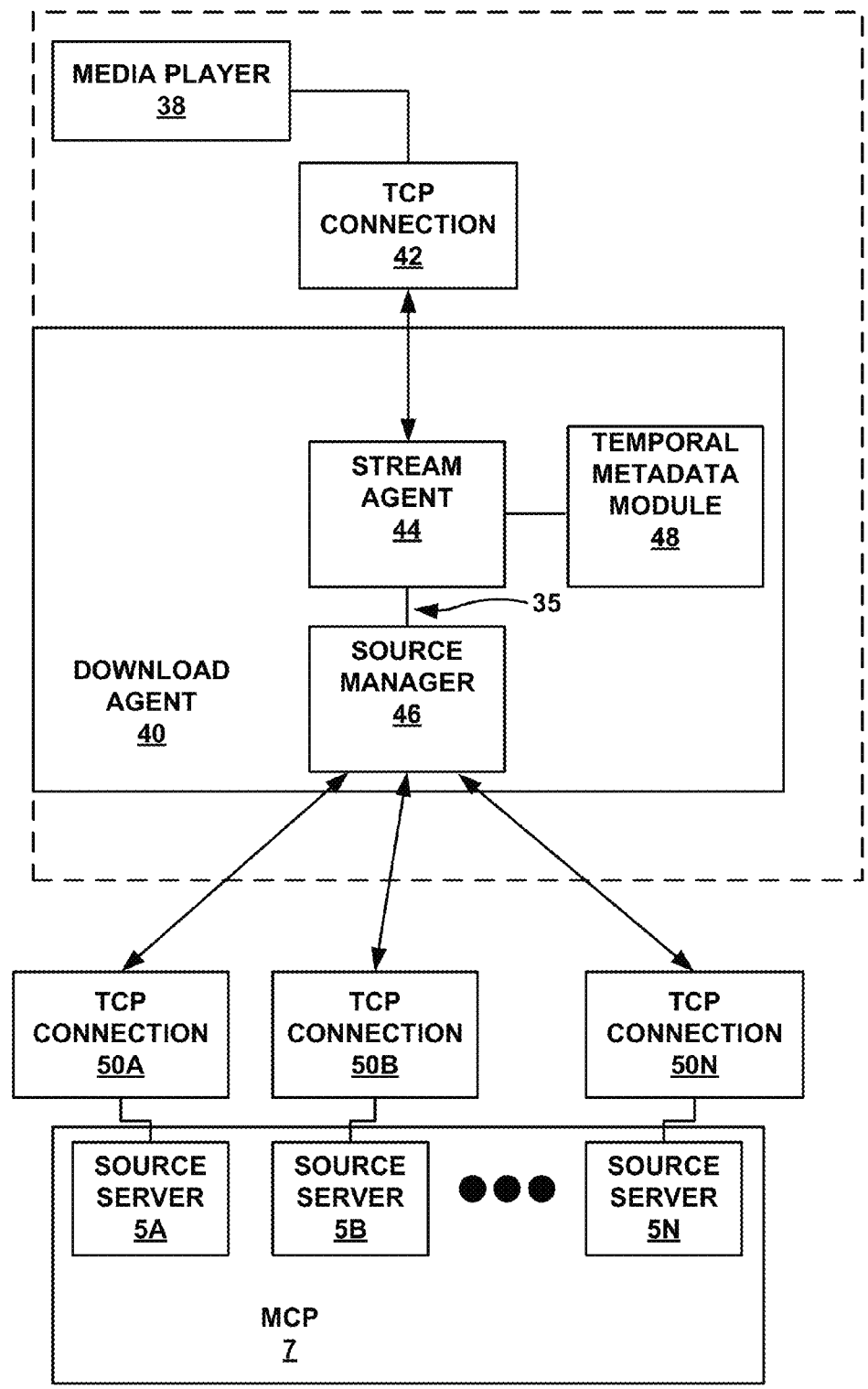
FIG. 5 is a block diagram illustrating an exemplary download agent connected to source servers.

FIG. 5 is a block diagram illustrating an exemplary download agent 40 connected to source servers 5. For clarity, the other components on client device 4 have been omitted to show the relationship between download agent 40 and source servers 5. In the example embodiment, download agent 40 includes stream agent 44, source manager 46, and temporal metadata module 48. For purpose of example, media player 38 is shown as external to download agent 40, however, as described above, download agent 40 may encapsulate media player 38.

As shown in FIG. 5, download agent 40 provides content to media player 38 via a single TCP connection 42 internal to client device 4. Download agent 40 may, for example, open and maintain a single socket connection for communication of downloaded media content to media player via TCP connection 42. In this example, TCP connection 42 may be a standard transmission control protocol (TCP) connection used in Open Systems Interconnection Basic Reference Model (OSI). TCP connection 42 remains constant between media player 38 and download agent 40 regardless of which source servers 5 a particular media asset is being downloaded from by download agent 40; download agent 40 seamlessly splices the media assets onto TCP connection 42 so that media player 38 is unaware of any dynamic switches selected by download agent 40.

MCP 7 may include a plurality of source servers 5 that generally store media assets. As shown in FIG. 5, download agent 40 may initiate and establish a plurality of different TCP connections 50A-50N (herein referred to as "TCP connections 50") through network 8 for downloading one or more media assets from source servers 5. As shown in FIG. 5, each one of TCP connections 50 connects to each one of source servers 5, respectively. In some examples, there may be more than one connection from download agent 40 to one of source servers 5. Furthermore, download agent 40 may establish TCP connections 50 only with source servers 5 that are deemed to be in the available stated (FIG. 3). If a source server 5 is not in the available state, download agent 40 may disable the TCP connection with that source server 5.

In general, source manager 46 handles connection management for access and retrieval of data from media assets stored on source servers 5. Source manager 46 handles all specific implementation details necessary for acquiring the media asset and providing the data to stream agent 44. In this example, source manager 46 implements a plurality of TCP network stacks and may concurrently handle multiple TCP connections 42 to source servers 5. Source manager 46 multiplexes the input data streams from source servers 5 as directed by stream agent 44 in examples where download agent 40 download the media asset in parallel from different source servers 5. In examples where download agent 40 sequentially downloads the media assets from different source servers 5, source manager 46 slices together the different portions of the media assets.

To handle all specific implementation details necessary for acquiring the media asset, source manager 46 may monitor the characteristics of the data flowing from each of the different paths using an internal flow manager. The flow manager may be responsible for starting the download of media assets from the various paths, cancelling the download of media assets from the various paths, and determining how much of media file should be downloaded from which source servers 5 and at what time. The flow manager represents the paths to the sources as an inverted tree having a plurality of nodes arranged into different levels. The flow manager of source manager 46 may determine the flow characteristics at different nodes at four levels. The four levels, starting from bottom to top, may be flow channel nodes, data source group nodes, super data source group nodes, and a root node. Each node may track the number of bytes received at that node as well as the rate at which those bytes are received (e.g., the throughput rate of the received bytes). A node at a given level may contain aggregate data for all the nodes below it. Accordingly, the root node may provide a continuous value for the total throughput of the system, e.g., the total throughput rate at which client device 4 receives the data.

The flow channel node may be the actual paths to source servers 5. For example, a first flow channel may be a path to source server 5A, a second flow channel may be a path to source server 5B, and so on. The data coming through the flow channels, e.g., media assets or parts of media assets, may be inspected for correct semantics. If there is error in the data from a particular flow channel, that flow channel may be designated as failed, and no additional data may be downloaded via that particular flow channel. There may be one or more flow channels associated with each data source node. For example, a first and second path may be associated with a first data source group node, and a third and fourth path may be associated with a second data source group node. The downloaded data from the flows may be propagated to their corresponding data source group node.

A data source group node may collect runtime data from each flow channel associated with the data source group node. For example, the data source group node may collect timing estimators, e.g., estimate of how long it took to receive the data, throughput rate, number of bytes received for each flow channel. In some examples, the data source group node may also collect data such the amount of bandwidth utilized by the various source servers 5.

Source servers 5 of each data source group node may be in a state of: untested, test pending, untested retry, available, unavailable retry, available busy, and unavailable. Source manager 46 may determine the status of each of source servers 5 as described in detail in the disclosure with respect to FIG. 3. Generally, source manager 46 finds source servers 5 that are in the available state. Source servers 5 that are in the available state may be suitable source servers 5 from which download agent 40 downloads.

Notably, before source manager 46 determines the characteristics of source servers 5, source manager 46 may initially determine the state of each of source servers 5. To determine the state of each source server 5, source manager 46 may initially open a socket, e.g., TCP connection 50, to source server 5A, as one example. Source manager 46 may keep the socket open to determine whether source server 5A is in the available state. If source server 5A is determined to be in the available state, e.g., after the test pending state, source manager 46 keeps the socket open to source server 5A until source manager 46 considers source server 5A in the untested state. During the test pending state and the untested retry state, source manager 46 may keep the socket open to source server 5A until source manager 46 transitions source server 5A to the unavailable state. If source manager 46 transitions source server 5A from the available state to the available busy state or the unavailable retry state, source manager 46 keeps the socket open to source server 5A. However, if source server 5A is determined to be unavailable or was available but source manager 46 has transitioned source server 5A to the untested stated, source manager 46 may close the socket to source server 5A.

The super data source group node is a parent to the one or more of the data source group nodes. At the super data source group node, source manager 46 determines the number of bytes received from each one of source server 5 as indicated in the data source group nodes and the throughput rate of the source servers 5. At the root node, all the data from the other nodes, e.g., flow channel, data source group, and super data source group, may be ultimately funneled to the root node. Accordingly, the root node may contain information regarding the status of source servers 5, e.g., state of source servers 5, the throughput rate of source servers 5, and which source servers 5 should be downloaded from and at what time. The root node may also receive information about the total throughput rate, e.g., the summation of the throughput rate of each of source servers 5.

Additionally, in some examples, source manager 46 may also store the peak download times for source servers 5, the geographical locations of source servers 5, the billing contracts by MCP 7 for each of the source servers 5, and the autonomous system number of source servers 5. Moreover, in some examples, source manager 46 may also store information related to the privilege level of client device 4 and the client side autonomous system number.

Accordingly, source manager 46 continuously tracks the status and characteristics of source servers 5. The status may indicate the state of source servers 5, and download agent 40 may only download from source servers 5 that are currently in the available state. The characteristics may be considered as factors that download agent 40 needs to consider when downloading from the various source servers 5. Some of the characteristic information may need to be provided by source servers 5. For example, the peak download times, the geographic location, the autonomous system numbers, and the billing characteristics. The geographic location and the autonomous system numbers may be ascertained based on the IP addresses of source servers 5. The peak download times and the billing characteristics information, e.g., the amount of bandwidth utilization by source servers 5, may be provided periodically by source servers 5. Alternatively, source manager 46 may transmit a query to source servers 5. In response, source servers 5 may transmit back information regarding their peak download times and bandwidth utilization, as examples.

Based on the characteristics and state information, stream agent 44 may determine from which source servers 5 to download the media assets. However, before stream agent 44 can determine from which source servers 5 to download, stream agent 44 may ascertain the required bandwidth for different portions of the media assets. Stream agent 44 may determine from which source servers 5 to download the media assets based on the status information and the required bandwidth information.

Temporal metadata module 48 may determine the required bandwidth information of the media asset. For non time-critical content, in some examples, information of the timestamps and corresponding byte ranges or offsets of the media asset at different portions may be stored as metadata that is separately downloadable or may be stored in the initial portion of the media asset. In such examples, temporal metadata module 48 may request stream agent 44 to output a request to download the metadata from at least one of source servers 5 that are in the available state as determined by source manager 48.

Generally, the metadata is short, and therefore does not require parallel download. Stream agent 44 may output the request for the metadata from the source server 5 that is determined to have the fastest throughput rate by source manager 46. After receiving the metadata, stream agent 44 may store the metadata in temporal metadata module 48. Temporal metadata module 48 then calculates the required bandwidth for different portions of the media asset based on the stored metadata. Temporal metadata module 48 then stores the required bandwidth information.

To compute the bandwidth requirements for portions of the media asset temporal metadata module 48 first determines the starting and ending byte offsets for the portion of the media asset and the starting and ending portion of timestamps for the portion of the media asset. Temporal metadata module 48 then subtracts the starting byte offset from the ending byte offset to calculate the total bytes in the portion. Temporal metadata module 48 subtracts the starting timestamp from the ending timestamp to calculate the total duration of the portion. Temporal metadata module 48 multiplies the total byte in the portion by eight to calculate the total bits in the portion. Temporal metadata module 48 then divides the total bits in the portion by the total duration in the portion to calculate the required bandwidth for that portion. Stream agent 44 may then utilize the required bandwidth information and the characteristics determined by source manager 46 to determine how much of the media asset should be download from which source servers 5.

In some examples, such as time-critical content, the metadata may not be separately downloadable and may not be stored at the beginning of the media asset because not all the media content is generated. Moreover, in some examples, even for non time-critical content, the metadata may not be available, e.g., may not be separately downloadable and may not be stored at the beginning of the media asset. In such examples, temporal metadata module 48 may request stream agent 44 to output a request to download the timestamps and corresponding byte ranges or offsets of frames that are stored on source servers 5 but whose content has not be downloaded by stream agent 44. Stream agent 44 may receive the metadata for the frames and temporal metadata module 48 may store the metadata. Temporal metadata module 48 may then calculate the required bandwidth for different portions of the media asset based on the stored metadata.

Alternatively, for time-critical content or non time-critical content, temporal metadata module 48 may track required bandwidth for frames that have already been downloaded to estimate the required bandwidth for upcoming frames that have not been downloaded. For example, temporal metadata module 48 may keep continuous average of the received bandwidth for all received frames. Based on the average, temporal metadata module 48 may calculate a standard deviation. Temporal metadata module 48 may add the calculated standard deviation to the average required bandwidth to estimate the required bandwidth for not yet downloaded frames. As another example, rather than keeping a continuous average of the required bandwidth for all received frames, temporal metadata module 48 may only average the required bandwidth for 20 just received frames. 20 just received frames is provided only for example, any number of previously downloaded frames may be used. Temporal metadata module 48 may then calculate the standard deviation and add the standard deviation to the average to estimate the required bandwidth for not yet received frames. Generally, it may be more beneficial to utilize the required bandwidth information for some of the previously downloaded frames rather than the required bandwidth information for all of the previously downloaded frames. The required bandwidth generally deviates substantially from its average required bandwidth during rapid changes or during times when there is just speech and little movement in the media content. Rapid changes or times when there is just speech in the media content may be better indicated by the required bandwidth for some of the previous frames rather than the average required bandwidth for all of the previous frames. Stream agent 44 may then utilize the required bandwidth information and the characteristics of source servers 5 determined by source manager 46 to determine how much of the media asset should be download from which source servers 5.

For example, if the required bandwidth for a portion of the media asset is lower relative to the average required bandwidth of the media asset, stream agent 44 may select source servers 5 that have low throughput rate to download that portion of the media asset. On the other hand, if the required bandwidth for a portion of the media asset is higher relative to the average required bandwidth of the media asset, stream agent 44 may select source servers 5 that have a higher throughput rate, but insure that selection of these source servers 5 does not incur additional costs for the MCP 7 based on the billing characteristics for those source servers 5. In some examples, stream agent 44 may account for all the various characteristics and the required bandwidth information stored in temporal metadata module 48 to determine how much of the media asset should be downloaded from which source servers 5. Some of the various characteristics may compete against each other. For example, the peak download time for a source server may be low when download agent 40 wishes to download media assets; however, the geographic location for that source server may be distant compared to a geographically proximate source server that is experiencing high peak download times.

Accordingly, stream agent 44 may value different characteristics differently for various examples. For example, stream agent 44 may value geographically proximity more than peak download times. As another example, stream agent 44 may value billing characteristics more than autonomous system numbers. There may be various combinations and permutations of how much weight should be given to each characteristic of source servers 5 and client device 4, e.g., privilege level and are contemplated by this disclosure. Generally, stream agent 44 will give substantial weight to the client privilege level. Also, the combination of client side autonomous system number and source servers 5 geographic location may be very useful for finding appropriate source servers 5 that may be off peak at geographic location of the source servers 5 during peak times elsewhere. For example, a source server 5 located in Minneapolis, Minn. will have a different peak time than a source server 5 located in Tokyo, Japan because when it is daytime in Minnesota, it is nighttime in Japan, and vice versa. The client side autonomous system number and the geographic location of source servers 5 may allow MCP 7 to globally even out network peaks. Furthermore, paths to eight source servers 5 in countries outside United States of America and paths to four source servers 5 within the United States of America may be optimum for a client device 4 that is within the United States of America. The eight source servers 5 outside the United States of America and the four source servers 5 within the United States of America may be on different networks, e.g., via different service providers 3 (FIG. 1).

In implementation, at the initial occurrence where client 42 (FIG. 4) requested for media content, stream agent 44 may download metadata and calculate required bandwidth information, in examples where the metadata is available, and some of the first media asset from source servers 5 that are determined to have the fastest throughput rate as determined by source manager 46. At this initial point, stream agent 44 does not evaluate the other characteristics. Stream agent 44 may not transmit the data to media player 38 for display. Rather, stream agent 44 may temporally store the information in a buffer of media player 38.

For time-critical content such as a live event certain tradeoffs may be necessary to determine how much data should be initially downloaded. The more data that is initially stored before being displayed allows stream agent 44 more time to determine the optimum download paths from the various source servers 5. For example, if client device 4 is delayed, i.e., backset, by 10 seconds worth of media content, stream agent 44 may have additional time to determine optimal paths to download the additional media content from source servers 5 as compared to a delay of only 2 seconds worth of data. However, for live events like a sporting event, consumer 42 may not desire to be delayed by this much amount, and would rather view the live events closer to the now point of the live event. Accordingly, a balance may be struck between how much to delay client device 4 versus the needed to finding optimal paths. For non time-critical content where the required bandwidth information is not available, stream agent may download large amounts of initial media content because it may be immaterial to client 42 to be delayed a few seconds before display starts.

Once stream agent 44 downloads the initial media content, stream agent 44 may then open a send window associated with the specific source server. The size of the send window may be based on determinations made by stream agent 44. For example, stream agent 44 may determine how much data to download from source servers 5A, 5B, and 5D based on the required bandwidth information and the characteristics determined by source manager 46. The size of the send window may be the size of the portion of the media asset that needs to be downloaded from each of source servers 5A, 5B, and 5D. Stream agent 44 then causes source manager 46 to transmit a request to the appropriate source servers 5, e.g., source servers 5A, 5B, and 5D.

In the context of video, the media assets typically contain a plurality of video frames encoded in accordance with a video compression scheme. One type of frame is referred to as a key frame or intra picture that can be decoded without reference to other frames and may, for example, provide an entire encoded picture. The term "key frame" is used herein to generally refer to this type of frame within an encoded media stream. In the context of H.264 coding, key frames are referred to as "i-frames." Between each key frame are predicted pictures or bi-predicted pictures that generally contain image data and motion vector displacements that are relative to the previous key frame in the media file. Each key frame may be associated with a timestamp. A timestamp is the temporal location of the key frame, i.e. the amount of time the media file is played before it reaches the key frame. Instead of a timestamp, each key frame may be associated with byte ranges, i.e., the amount of bytes played before it reaches the key frame. The size of the send window may be based on the timestamp or byte ranges.

Stream agent 44 then opens a receive window and closes the send window. The receive window may multiplex the portions of the media asset downloaded in parallel from the source servers 5, as one non-limiting example. The size of the receive window may be the total size of the send window, e.g., the total of the size from source servers 5A, 5B, and 5D. Stream agent 44 then opens a verify window. Stream agent 44 receives the data and in the verify window ensures the data is correctly received without errors. Stream agent 44 in the verify window may verify the bytes by a verification process. Stream agent 44 in the verify window may determine if there are corrupt bytes. The corrupt bytes are bytes that failed the verification process.

Once the bytes have been verified, stream agent 44 closes the receive and verify windows and opens a consume window. The consume window takes in the multiplexed data and provides the data to media player 38. Stream agent 44 then closes the consume window. Media player 38 then displays the data to consumer 42. In this manner, stream agent 44 continuously opens and closes various windows in a sliding window fashion to receive the various portions of the media asset from the various source servers 5.

Stream agent 44 may be preprogrammed to perform actions on specific media file formats such as Flash Format (FLU) used by Adobe Flash Player, provided by Adobe Systems, Inc., Advanced System Format (ASF) used by Windows Media Player, provided by Microsoft Inc., or other media file formats. Stream agent 44 may also ensure that download from each one of source servers 5 is forecasted based on conditions and that the resultant data stream are stitched together at temporally correlated key frames. In this manner, consumer 42 viewing media player 38 may be oblivious to the automated functions of download agent 40.

Figure 6:
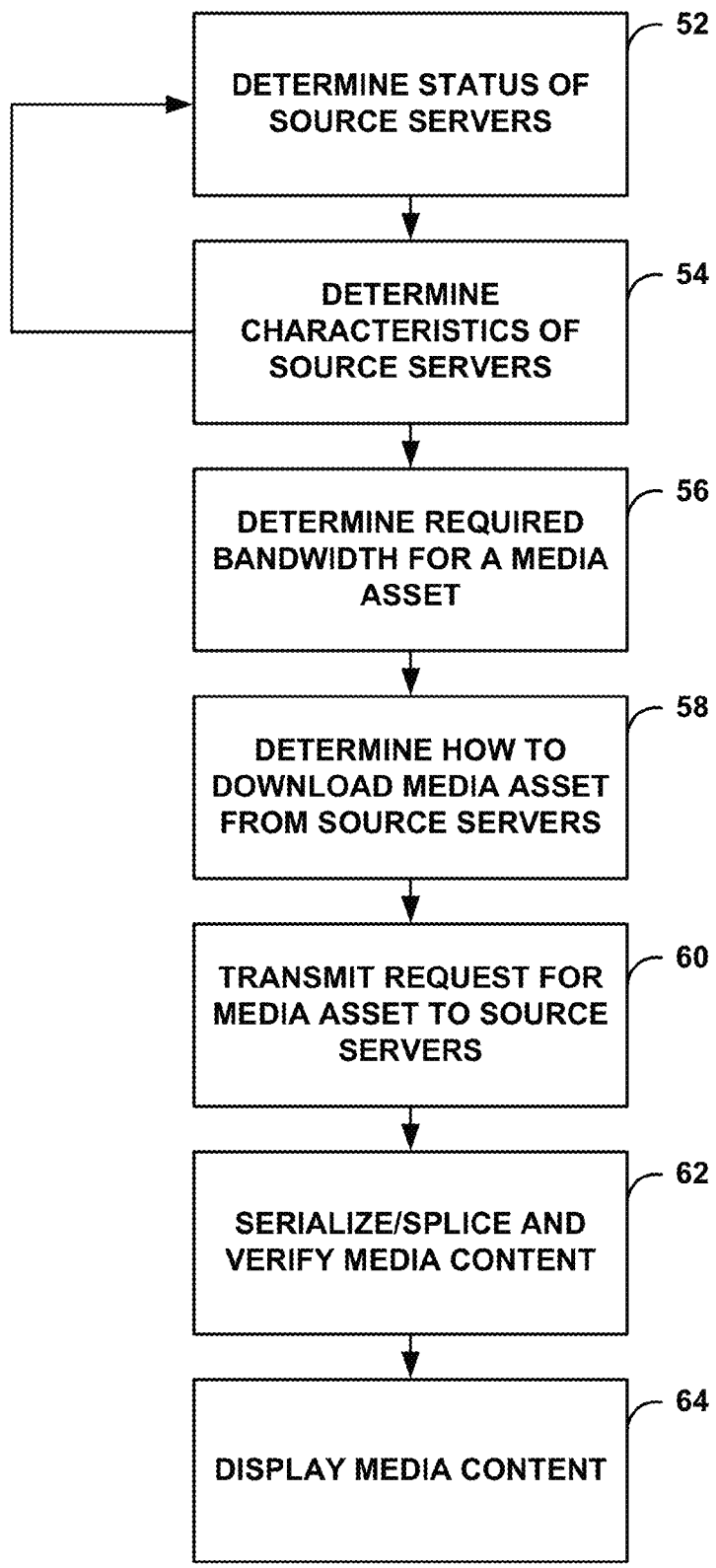
FIG. 6 is a flow diagram illustrating an example operation of the download agent.

FIG. 6 is a flow diagram illustrating an example operation of download agent 40. For purposes of illustration reference will be made to FIG. 5. As described, source manager 46 continuously determines the status of each of source servers 5 and updates the state data within the tree data structure to represent a state for each of the source servers (52). As described in more detail with respect to FIG. 3, source manager 46 may continuously test each of the source servers 5 and classify each of source servers 5 in one of an untested state, test pending state, untested retry state, available state, unavailable retry state, available busy state, or an unavailable state.

Source manager 46 may then continuously determine and maintain state data representing certain characteristics of the available source servers (54). The characteristics may include throughput rates of source servers 5, peak download times of source servers 5, geographic location of the source servers 5, the privilege level of client device 4, client-side autonomous system (AS) number, bandwidth utilization for billing of source servers 5, e.g., 95/5 billing, and the like. The characteristics of source servers 5 may be considered as factors that are evaluated by stream agent 44 to determine how much data should be downloaded from which source servers.

Temporal metadata module 48 may determine the required bandwidth information of the media asset. In some example, temporal metadata module 48 may request stream agent 44 to output a request to download metadata from at least one of source servers 5. Temporal metadata module 48 may store the metadata. The metadata may indicate the timestamps and corresponding byte ranges or offsets at various portions of the media asset. Temporal metadata module 48 then calculates the require bandwidth for the various portions based on the timestamps and corresponding byte ranges or offsets (56). In some examples, the portions may be divided at key frames. The key frames may be indicated by timestamps or byte ranges. The metadata may be separately downloadable or may be embedded at the beginning of the media asset.

In some examples, the metadata may not available. In such examples, temporal metadata module 48 may request stream agent 44 to output a request to receive metadata information located in headers of encoded frames. Stream agent 44 does not request the content of the frames, just the header portion that indicates the timestamps and corresponding byte ranges or offsets. Temporal metadata module 48 may store the metadata. Temporal metadata module 48 then calculates the required bandwidth based on the timestamps and corresponding byte ranges. Alternatively, rather than downloading the metadata information from a frame, temporal metadata module 48 may estimate the bandwidth of upcoming frames based on the required bandwidth of previously downloaded frames.

Stream agent 44 may then determine how much of the media asset should be downloaded from which source servers 5 (58). Stream agent 44 may check the required bandwidth information stored in temporal metadata module 48 and the status and characteristics of source servers 5 determined by source manager 46. Stream agent 44 may then weigh the various characteristics and determine the optimum paths to source servers 5 and determine how much data should be downloaded from those source servers 5.

Stream agent 44 may then transmit a request to the determined source server 5 (60). After stream agent 44 determines how much data should be downloaded from which source servers 5, stream agent 44 may transmit a request to each of those source servers 5 identifying the temporal range or byte range of data that stream agent 44 desires to download from the determined optimum source servers 5.

Stream agent 44 may receive the requested data from the various source servers 5. Stream agent 44 may then serialize the data from the different source servers 5 and verify to ensure there are not corrupt bytes (62). Stream agent 44 may then transmit the serialized data to media player 38. Media player 38 then displays the media content to client 42 (64).

Figure 7:
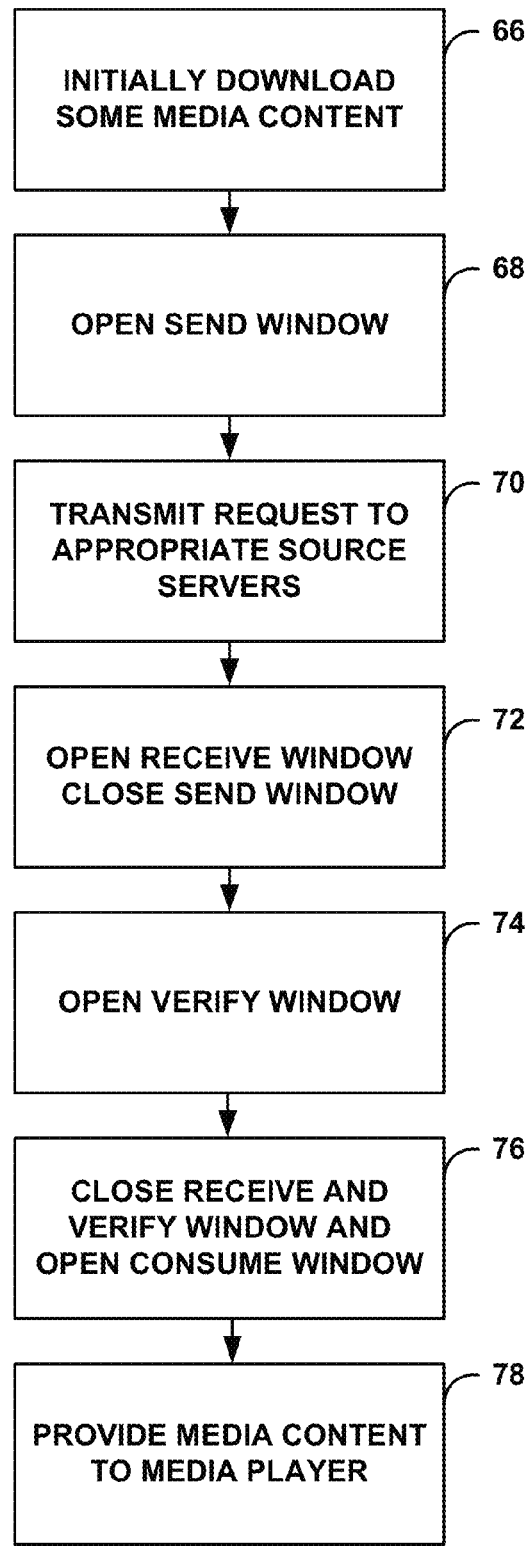
FIG. 7 is a flow diagram illustrating an example operation of stream agent.

FIG. 7 is a flow diagram illustrating an example operation of stream agent 44. Stream agent 44 initially downloads some media content from the source servers 5 that experience the highest throughput rates (66). Once stream agent 44 downloads the initial media content, stream agent 44 may then open a send window for each of the connections to the selected source servers (68). The size of the send window may be based on determinations made by stream agent 44. The size of the send window may be the size of the portion of the media asset that needs to be downloaded from each of source servers 5. Stream agent 44 then causes source manager 46 to transmit a request to the appropriate source servers 5 (70).

Stream agent 44 then opens a receive window and closes the send window (72). The receive window may multiplex the portions of the media asset downloaded from the source servers 5. The size of the receive window may be the total size of the send window. Stream agent 44 then opens a verify window (74). Stream agent 44 receives the data and in the verify window ensures the data is correctly received without errors. Stream agent 44 in the verify window may verify the bytes by a verification process. Stream agent 44 in the verify window may determine if there are corrupt bytes. The corrupt bytes are bytes that failed the verification process.

Once the bytes have been verified, stream agent 44 closes the receive and verify windows and opens a consume window (76). The consume window takes in the multiplexed data and provides the data to media player 38 (78). Stream agent 44 then closes the consume window. Media player 38 then displays the data to consumer 42. In this manner, stream agent 44 continuously opens and closes various windows in a sliding window fashion to receive the various portions of the media asset from the various source servers 5.

As described so far, download agent 40 may determine the optimum paths to download media assets from source servers 5. However, in some examples, source servers 5 may not be capable of providing the media asset in a timely fashion. For example, the total throughput from all of source servers 5 could be less than the required bandwidth of a media asset. In such examples, download agent 40 may be capable of selecting different media assets such that source servers 5 can provide the media asset to client device 4 in a timely fashion.

As described above, each one of source servers 5 store copies of media assets that are encoded based on a VBR technique. In some examples, each of source servers 5 may store additional media assets that encoded based on VBR techniques. However, the required bandwidth for these additional media assets may be less than the required bandwidth for the original media assets. The additional media assets may be encoded for a playback rate that is less than the playback rate of the original media assets. In other words, source servers 5 may store a first set of media assets and store a second set of media assets that are encoded for a lower playback rate than the first set of media assets. Both the first and second sets of media assets may be encoded using VBR techniques. Notably, the media content between the first and second sets of media assets may be the same. Generally the media assets encoded for a lower playback rates provide lower quality video compared to media assets encoded for a higher playback rates. Accordingly, download agent 40 may first try to download media assets with the highest quality. However, if such media assets cannot be downloaded in a timely fashion or in a fashion that does not increase the costs incurred by MCP 7, download agent 40 may select media assets encoded for a lower playback rate so that the media content can be downloaded.

In such examples, if download agent 40 cannot find suitable paths to source servers 5 so that the first set of media assets can be downloaded in a timely fashion without increasing costs, download agent 40 may dynamically transition from the first set of media assets to the second set of media assets. Stream agent 44 may dynamically switch from the first set of media assets to the second set of media assets at appropriate key frames.

To dynamically switch from the first set of media assets to the second set of media assets, temporal metadata module 48 may first determine the required bandwidth information for the second set of media assets utilizing similar techniques as those described above. Next, temporal metadata module 48 correlates timestamps for key frames for the different sets of media assets to byte offsets in the various encoded media asset bandwidths. For example, temporal metadata module 48 may be arranged as an array or other data structure that identifies sets of key frames having substantially similar time offsets within the media to be presented (e.g., a first set of key frames having a key frame selected from each of the media assets at approximately 3 seconds of playback, a second set of key frames associated with approximately 7 seconds of playback, and the like). Temporal metadata module 48 then correlates the key frames of each of the sets to appropriate byte offsets. In this way, the byte offsets within media assets for temporally proximate key frames are correlated and stored within temporal metadata module 48. An example technique for correlating the time stamps to key frames is provided in application Ser. No. 12/252,782, entitled "MEDIA PLAYBACK POINT SEEKING USING DATA RANGE REQUESTS," filed Oct. 16, 2008, which claims priority to 60/981,164, filed Oct. 19, 2007, the entire contents of each is incorporated herein by reference.

In such examples, stream agent 44 splices the data from the different media assets encoded for different playback rates at key frames. Stream agent 44 then provides the spliced stream to media player 38 for presentation to client 42.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software, the techniques may be realized at least in part by a computer-readable medium comprising instructions that, when executed, cause a processor to perform one or more of the methods described above. For example, the computer-readable medium may store such instructions.

A computer-readable medium may form part of a computer program product, which may include packaging materials. A computer-readable medium may comprise a computer data storage medium such as RAM, SDRAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by processing circuitry including one or more processors, such as one or more DSPs, general purpose microprocessors, ASICs, FPGAs, ASSPs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
   determining, by one or more processors of a client device, states of a plurality of servers associated with a media content provider, wherein the states of the plurality of the servers indicate availability of the plurality of servers to deliver a media asset to the client device;
   determining, by the one or more processors of the client device, a subset of the plurality of servers available to deliver the media asset to the client device in view of the determined states;
   determining, by the one or more processors of the client device, characteristics associated with the subset of the plurality of servers, wherein the characteristics comprise a cost to transmit the media asset to the client device from the subset of the plurality of servers through a plurality of service providers (SP) to the client device and throughput rates of the subset of the plurality of servers, wherein the cost is indicative of a fee charged to the media content provider by different SPs of the plurality of SPs based on bandwidth utilization by the subset of the plurality of servers, wherein the subset of the plurality of servers use the different SPs of the plurality of SPs to transmit the media asset;
   estimating, by the one or more processors of the client device, a first bit rate at which the client device is to receive a first portion of the media asset, wherein the first bit rate is to provide for uninterrupted playback of the media asset, and wherein the first portion corresponds to data for a first playback time period of the media asset, wherein estimating the first bit rate comprises:
      receiving metadata associated with the media asset, wherein the metadata comprises a starting timestamp, an ending timestamp, a starting byte offset, and an ending byte offset associated with the first portion of the media asset, and
      computing the first bit rate of the first portion based on the metadata; and
   selecting, by the client device and based on the determined characteristics and the first bit rate, one or more servers from the subset of the plurality of servers to deliver the first portion of the media asset to the client device.

2. The method of claim 1, further comprising:
   estimating a second bit rate associated at which the client is to receive a second portion of the media asset, wherein the second portion corresponds to data for a second playback time period of the media asset that temporally follows the first playback time period of the first portion of the media asset; and
   selecting, based on the determined characteristics and the second bit rate, one or more servers from the subset of the plurality of servers to deliver the second portion of the media asset to the client device.

3. The method of claim 1, further comprising:
   receiving the first portion of the media asset;
   serializing the first portion of the media asset into a stream; and
   verifying the stream to determine bytes in the stream are uncorrupted.

4. The method of claim 1, further comprising:
   monitoring the states of the plurality of servers; and
   maintaining state data indicative of the states of the plurality of servers, wherein the states comprise an untested state, a test pending state, an untested retry state, an available state, an unavailable retry state, an available busy state, or an unavailable state.

5. The method of claim 4, wherein determining the subset of the plurality of servers available to deliver the media asset the client device in view of the determined states comprises selecting the subset of the plurality of servers having the available state.

6. The method of claim 1, wherein the characteristics comprise one or more of the throughput rates of the subset of the plurality of servers, peak download times of the subset of the plurality servers, geographic locations of the subset of the plurality of servers, a privilege level of the client device, a client-side autonomous system (AS) number, or the cost to transmit the media asset to the client device from the subset of the plurality of servers.

7. The method of claim 1, further comprising
receiving the characteristics from the plurality of servers in response to a query.

8. The method of claim 1, wherein the first playback time period is determined based on one or more key frames of the media asset.

9. The method of claim 1, wherein estimating the first bit rate at which the client device is to receive the first portion of the media asset is based on previously downloaded frames of the media asset and comprises:
determining an average bit rate for the previously downloaded frames; and
increasing or decreasing the average bit rate based on whether bandwidth for the previously downloaded frames respectively increased or decreased over subsequent frames of the previously downloaded frames.

10. The method of claim 1, wherein selecting the one or more servers from the subset of the plurality of servers to deliver the first portion of the media asset to the client device further comprises:
selecting a first server from the subset of the plurality of servers to deliver a first sub-portion of the first portion of the media asset to the client device; and
selecting a second server from the subset of the plurality of servers to deliver a second sub-potion of the first portion of the media asset to the client device, wherein selecting the first server and the second server is based on the determined characteristics and the first bit rate.

11. The method of claim 1, wherein estimating the first bit rate at which the client device is to receive the first portion of the media asset further comprises:
downloading header information for one or more encoded frames prior to the one or more encoded frames being received by the client device, wherein the one or more encode frames represent the first portion of the media asset, and wherein the header information indicates one or more timestamps and one or more corresponding byte offsets for the one or more encoded frames; and
computing the first bit rate of the first portion of the media asset based on starting and ending byte offsets of the one or more encoded frames and starting and ending timestamps of the one or more encoded frames.

12. The method of claim 2, wherein the first portion of the media asset and the second portion of the media asset are encoded at different bit rates.

13. A device comprising:
a memory; and
one or more processors of a client device, coupled to the memory, to:
determine states of a plurality of servers, wherein the states of the plurality of the servers associated with a media content provider indicate availability of the plurality of servers to deliver a media asset to the client device;
determine a subset of the plurality of servers available to deliver the media asset the client device in view of the determined states;
determine characteristics associated with the subset of the plurality of servers, wherein the characteristics comprise a cost to transmit the media asset to the client device from the subset of the plurality of servers through a plurality of service providers (SP) to the client device and a throughput rate of the subset of the plurality of servers, wherein the cost is indicative of a fee charged to the media content provider by different SPs of the plurality of SPs based on bandwidth utilization by the subset of the plurality of servers, wherein the subset of the plurality of servers use the different SPs of the plurality of SPs to transmit the media asset;
estimate a first bit rate at which the client device is to receive a first portion of the media asset, wherein the first bit rate is to provide for uninterrupted playback of the media asset, and wherein the first portion corresponds to data for a first playback time period of the media asset, wherein to estimate the first bit rate, the one or more processors to:
receive metadata associated with the media asset, wherein the metadata comprises a starting timestamp, an ending timestamp, a starting byte offset, and an ending byte offset associated with the first portion of the media asset, and
compute the first bit rate of the first portion based on the metadata; and
select based on the determined characteristics and the first bit rate, one or more servers from the subset of the plurality of servers to deliver the first portion of the media asset to the client device.

14. The device of claim 13, wherein the one or more processors further to:
estimate a second bit rate associated at which the client is to receive a second portion of the media asset, wherein the second portion corresponds to data for a second playback time period of the media asset that temporally follows the first playback time period of the first portion of the media asset; and
select, based on the determined characteristics and the second bit rate, one or more servers from the subset of the plurality of servers to deliver the second portion of the media asset to the client device.

15. The device of claim 13, wherein to select the one or more servers from the subset of the plurality of servers to deliver the first portion of the media asset to the client device, the one or more processors further to:
selecting a first server from the subset of the plurality of servers to deliver a first sub-portion of the first portion of the media asset to the client device; and
selecting a second server from the subset of the plurality of servers to deliver a second sub-potion of the first portion of the media asset to the client device, wherein selecting the first server and the second server is based on the determined characteristics and the first bit rate.

16. The device of claim 13, the one or more processors further to:
receive the first portion of the media asset;
serialize the first portion of the media asset into a stream; and
verify the stream to determine bytes in the stream are uncorrupted.

17. The device of claim 13, wherein the one or more processors is further to:
monitor the states of the plurality of servers; and
maintain state data indicative of the states of the plurality of servers, wherein the states comprise an untested state, a test pending state, an untested retry state, an available state, an unavailable retry state, an available busy state, or an unavailable state.

18. The device of claim 17, wherein to determine the subset of the plurality of servers available to deliver the media asset the client device in view of the determined states, the one or more processors further to select the subset of the plurality of servers having the available state.

19. The device of claim 13, wherein the characteristics comprise one or more of the throughput rates of the subset of the plurality of servers, peak download times of the subset of the plurality of servers, geographic locations of the subset of the plurality of servers, a privilege level of the client device, a client-side autonomous system (AS) number, or the cost to transmit the media asset to the client device.

20. The device of claim 13, the one or more processors further to:
receive the characteristics from the plurality of servers in response to a query.

21. The device of claim 13, wherein the first playback time period is determined based on one or more key frames of the media asset.

22. The device of claim 13, wherein to estimate the first bit rate at which the client device is to receive the first portion of the media asset is based on previously downloaded frames of the media asset, the one or more processors to:
determine an average bit rate for the previously downloaded frames; and
increase or decrease the average bit rate based on whether bandwidth for the previously downloaded frames respectively increased or decreased over subsequent frames of the previously downloaded frames.

23. The device of claim 13, wherein to estimate the first bit rate at which the client device is to receive the first portion of the media asset is based on previously downloaded frames of the media asset, the one or more processors to:
downloading header information from one or more encoded frames prior to the one or more encoded frames being received by the client device, wherein the one or more encoded frames represent the first portion, and wherein the header information indicates one or more timestamps and one or more corresponding byte offsets of the one or more encoded frames; and
computing the first bit rate based on starting and ending byte offsets of the one or more encoded frames and starting and ending time stamps of the one or more encoded frames.

24. The device of claim 14, wherein first portion and the second portion of the media asset are encoded at variable bit rates.

25. The device of claim 13, wherein the client device comprises at least one of a personal computer, a laptop computer, a mobile telephone, a personal media player, a device integrated into a vehicle, a network telephone, a network television, a television set-top box, or a network appliance.

26. A non-transitory computer readable storage medium having instructions that, when executed by one or more processors, cause the one or more processors to perform operations comprising:
determining, by the one or more processors of a client device, states of a plurality of servers associated with a media content provider, wherein the states of the plurality of the servers indicate availability of the plurality of servers to deliver a media asset to the client device;
determining, by the one or more processors of the client device, a subset of the plurality of servers available to deliver the media asset the client device in view of the determined states;
determining, by the one or more processors of the client device, characteristics associated with the subset of the plurality of servers, wherein the characteristics comprise a cost to transmit the media asset to the client device from the subset of the plurality of servers through a plurality of service providers (SP) to the client device and a throughput rate of the subset of the plurality of servers, wherein the cost is indicative of a fee charged to the media content provider by different SPs of the plurality of SPs based on bandwidth utilization by the subset of the plurality of servers, wherein the subset of the plurality of servers use the different SPs of the plurality of SPs to transmit the media asset;
estimating, by the one or more processors of the client device, a first bit rate at which the client device is to receive a first portion of the media asset, wherein the first bit rate is to provide for uninterrupted playback of the media asset, and wherein the first portion corresponds to data for a first playback time period of the media asset, wherein estimating the first bit rate comprises:
receiving metadata associated with the media asset, wherein the metadata comprises a starting timestamp, an ending timestamp, a starting byte offset, and an ending byte offset associated with the first portion of the media asset, and
computing the first bit rate of the first portion based on the metadata; and
selecting, by the client device and based on the determined characteristics and the first bit rate, one or more servers from the subset of the plurality of servers to deliver the first portion of the media asset to the client device.

27. The non-transitory computer readable storage medium of claim 26, the operations further comprising:
estimating a second bit rate associated at which the client is to receive a second portion of the media asset, wherein the second portion corresponds to data for a second playback time period of the media asset that temporally follows the first playback time period of the first portion of the media asset; and
selecting, based on the determined characteristics and the second bit rate, one or more servers from the subset of the plurality of servers to deliver the second portion of the media asset to the client device.

28. The non-transitory computer readable storage medium of claim 26, wherein estimating the first bit rate at which the client device is to receive the first portion of the media asset is based on previously downloaded frames of the media asset, the operations further comprising:
determining an average bit rate for the previously downloaded frames; and
increasing or decreasing the average bit rate based on whether bandwidth for the previously downloaded frames respectively increased or decreased over subsequent frames of the previously downloaded frames.

29. The non-transitory computer readable storage medium of claim 26, wherein selecting the one or more servers from the subset of the plurality of servers to deliver the first portion of the media asset to the client device, the operations further comprising:
selecting a first server from the subset of the plurality of servers to deliver a first sub-portion of the first portion of the media asset to the client device; and selecting a second server from the subset of the plurality of servers to deliver a second sub-potion of the first portion of the media asset to the client device, wherein selecting the first server and the second server is based on the determined characteristics and the first bit rate.

30. A method comprising:

determining, by one or more processors of a client device, states of a plurality of servers associated with a media content provider, wherein the states of the plurality of the servers indicate availability of the plurality of servers to deliver a media asset to the client device;

determining, by the one or more processors of the client device, a subset of the plurality of servers available to deliver the media asset to the client device in view of the determined states;

determining, by the one or more processors of the client device, characteristics associated with the subset of the plurality of servers, wherein the characteristics comprise a cost to transmit the media asset to the client device from the subset of the plurality of servers through a plurality of service providers (SP) to the client device and throughput rates of the subset of the plurality of servers, wherein the cost is indicative of a fee charged to the media content provider by different SPs of the plurality of SPs based on bandwidth utilization by the subset of the plurality of servers, wherein the subset of the plurality of servers use the different SPs of the plurality of SPs to transmit the media asset;

estimating, by the one or more processors of the client device, a first bit rate at which the client device is to receive a first portion of the media asset, wherein the first bit rate is to provide for uninterrupted playback of the media asset, and wherein the first portion corresponds to data for a first playback time period of the media asset, wherein estimating the first bit rate comprises:

downloading header information for encoded frames of the first portion of the media asset prior to the encoded frames being received by the client device, wherein the header information indicates a starting timestamp, an ending timestamp, a starting byte offset, and an ending byte offset associated with the encoded frames, and computing the first bit rate of the first portion of the media asset based on the header information; and selecting, by the client device and based on the determined characteristics and the first bit rate, one or more servers from the subset of the plurality of servers to deliver the first portion of the media asset to the client device.

31. The method of claim 30, further comprising:

estimating a second bit rate associated at which the client is to receive a second portion of the media asset, wherein the second portion corresponds to data for a second playback time period of the media asset that temporally follows the first playback time period of the first portion of the media asset; and selecting, based on the determined characteristics and the second bit rate, one or more servers from the subset of the plurality of servers to deliver the second portion of the media asset to the client device.

32. A device comprising:

a memory; and one or more processors of a client device, coupled to the memory, to:

determine—states of a plurality of servers, wherein the states of the plurality of the servers associated with a media content provider indicate availability of the plurality of servers to deliver a media asset to the client device;

determine a subset of the plurality of servers available to deliver the media asset the client device in view of the determined states;

determine—characteristics associated with the subset of the plurality of servers, wherein the characteristics comprise a cost to transmit the media asset to the client device from the subset of the plurality of servers through a plurality of service providers (SP) to the client device and a throughput rate of the subset of the plurality of servers, wherein the cost is indicative of a fee charged to the media content provider by different SPs of the plurality of SPs based on bandwidth utilization by the subset of the plurality of servers, wherein the subset of the plurality of servers use the different SPs of the plurality of SPs to transmit the media asset;

estimate a first bit rate at which the client device is to receive a first portion of the media asset, wherein the first bit rate is to provide for uninterrupted playback of the media asset, and wherein the first portion corresponds to data for a first playback time period of the media asset, wherein to estimate the first bit rate, the one or more processors to:

download header information for encoded frames of the first portion of the media asset prior to the encoded frames being received by the client device, wherein the header information indicates a starting timestamp, an ending timestamp, a starting byte offset, and an ending byte offset associated with the encoded frames, and compute the first bit rate of the first portion of the media asset based on the header information; and select based on the determined characteristics and the first bit rate, one or more servers from the subset of the plurality of servers to deliver the first portion of the media asset to the client device.

33. The device of claim 32, wherein the one or more processors further to:

estimate a second bit rate associated at which the client is to receive a second portion of the media asset, wherein the second portion corresponds to data for a second playback time period of the media asset that temporally follows the first playback time period of the first portion of the media asset; and select, based on the determined characteristics and the second bit rate, one or more servers from the subset of the plurality of servers to deliver the second portion of the media asset to the client device.

* * * * *